US010462568B2

(12) United States Patent
Cho et al.

(10) Patent No.: US 10,462,568 B2
(45) Date of Patent: Oct. 29, 2019

(54) TERMINAL AND VEHICLE CONTROL METHOD OF MOBILE TERMINAL USING MACHINE LEARNING

(71) Applicant: LG ELECTRONICS INC., Seoul (KR)

(72) Inventors: Sungil Cho, Seoul (KR); Youngjun Kim, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/724,153

(22) Filed: Oct. 3, 2017

(65) Prior Publication Data

US 2018/0262834 A1 Sep. 13, 2018

(30) Foreign Application Priority Data

Mar. 8, 2017 (KR) ........................ 10-2017-0029578

(51) Int. Cl.
*H04R 3/12* (2006.01)
*G10L 15/07* (2013.01)
(Continued)

(52) U.S. Cl.
CPC ................ *H04R 3/12* (2013.01); *G06F 3/16* (2013.01); *G06F 3/167* (2013.01); *G10L 15/07* (2013.01);
(Continued)

(58) Field of Classification Search
CPC ......... H04M 1/72569; H04M 1/72577; H04M 1/72552; H04M 1/72547; H04L 51/24; H04L 67/2823
See application file for complete search history.

(56) References Cited

U.S. PATENT DOCUMENTS 8,000,689 B2 * 8/2011 Featherstone ........... H04W 4/02
455/414.1
8,487,760 B2 * 7/2013 Kangas ................. H04M 19/04
340/540
(Continued)

FOREIGN PATENT DOCUMENTS

EP 2835798 2/2015

OTHER PUBLICATIONS

European Patent Office Application Serial No. 18153840.6, Partial Search Report dated Jul. 11, 2018, 11 pages.

*Primary Examiner* — Kile O Blair
(74) *Attorney, Agent, or Firm* — Lee, Hong, Degerman, Kang & Waimey PC

(57) ABSTRACT

A terminal using machine learning for selecting an output mode based on the context information of a user. An embodiment of a terminal may include an audio output unit, a display, and a controller configured to obtain context information of a user, set an output mode of the mobile terminal based on the obtained context information, convert communication information of a first type received from an external device to a second type associated with the set output mode when the first type and the second type are different, and control the audio output unit or the display to output the communication information, wherein the audio output unit or the display is used to output the communication information based on the output mode. An embodiment may include a data learning unit configured to store data to implement machine learning and logic based determinations for selecting the output mode.

14 Claims, 21 Drawing Sheets

(51) Int. Cl.
*G06F 3/16* (2006.01)
*H04W 4/04* (2009.01)
*H04W 4/44* (2018.01)
*G10L 21/0216* (2013.01)

(52) U.S. Cl.
CPC ............ *H04W 4/046* (2013.01); *H04W 4/44* (2018.02); *G10L 2021/02165* (2013.01); *H04R 2430/01* (2013.01); *H04R 2499/13* (2013.01)

(56) References Cited

U.S. PATENT DOCUMENTS

| | | | |
|---|---|---|---|
| 8,868,039 B2* | 10/2014 | Rodriguez | H04M 1/7253 |
| | | | 455/411 |
| 9,043,474 B2* | 5/2015 | Schleifer | H04L 12/1818 |
| | | | 709/227 |
| 9,288,387 B1* | 3/2016 | Keller | H04N 21/44218 |
| 2007/0190944 A1* | 8/2007 | Doan | H04M 1/72569 |
| | | | 455/63.1 |
| 2012/0022872 A1 | 1/2012 | Gruber et al. | |
| 2013/0035117 A1* | 2/2013 | Litkouhi | H04L 67/12 |
| | | | 455/456.4 |
| 2014/0082501 A1* | 3/2014 | Bae | H04M 1/72569 |
| | | | 715/728 |

* cited by examiner

TERMINAL AND VEHICLE CONTROL METHOD OF MOBILE TERMINAL USING MACHINE LEARNING

CROSS-REFERENCE TO RELATED APPLICATIONS

Pursuant to 35 U.S.C. § 119(a), this application claims the benefit of earlier filing date and right of priority to Korean Patent Application No. 10-2017-0029578, filed on Mar. 8, 2017, the contents of which are hereby incorporated by reference herein in its entirety.

BACKGROUND OF THE INVENTION

1. Field of the Invention

The present disclosure relates to smart terminal technology, and more particularly, to a mobile terminal a vehicle control method of the mobile terminal for vehicle communication.

2. Description of the Related Art

Advancements have been made in context awareness technology which includes devices able to recognize or predict a user's needs based on historical information, a user's environment, context of a present status of a user, or a user's particular schedule, and the like, using machine learning, data mining, pattern recognition, and other intelligent algorithms and technologies.

Artificial intelligence is a field of computer engineering and information technology that studies a method of allowing a computer to perform thinking, learning, self-development, and the like that are carried out by human intelligence, and denotes allowing a computer to imitate human intelligent behaviors.

In addition, artificial intelligence does not exist by itself, but is directly or indirectly related to other fields of computer science. In particular, in modern times, artificial intelligence elements have been introduced into various fields of information technology, and attempts for using them to solve problems in the field have been actively carried out.

Meanwhile, in the related art, context awareness technology for recognizing a user's context using artificial intelligence and providing information desired by the user in his or her desired form has been actively studied.

With the development of the foregoing context awareness technologies, there is an increasing demand for an improved terminal capable of accurately and effectively performing a function suitable for a user's current or upcoming environment or context.

SUMMARY OF THE DISCLOSURE

An object of the present disclosure is to solve the above-mentioned problems and other problems. Another object of the present invention is to provide a mobile terminal that recognizes a user's context, and provides a communication device suitable for the user's context.

Specifically, an aspect of the present disclosure to provide a mobile terminal that outputs information in a different manner according to a user's context.

Furthermore, another aspect of the present disclosure is to provide a mobile terminal capable of entering information in a different manner according to a user's context.

In addition, still another aspect of the present disclosure to provide a vehicle control method for a mobile terminal that assists communication between passengers in a vehicle.

In order to achieve the foregoing objective, the present disclosure determines an output method of communication information received from an external device based on the user's context information.

According to a specific embodiment, the present disclosure may include an audio output unit, a display, and a controller configured to obtain context information of a user of the mobile terminal, set an output mode of the mobile terminal based on the obtained context information, convert communication information of a first type received from an external device to a second type associated with the set output mode when the first type and the second type are different, and control at least the audio output unit or the display to output the communication information, wherein the audio output unit or the display is used to output the communication information based on the set output mode.

According to an embodiment the controller is further configured to determine whether the user is available to receive audio information or visual information at the mobile terminal based on the obtained context information, and set the output mode based on the determination result.

According to an embodiment the set output mode corresponds to outputting the communication information using only one of the audio output unit or the display.

According to an embodiment the set output mode corresponds to outputting the communication information as only one of text-type or voice-type information.

According to an embodiment the controller is further configured to convert the communication information received from the external device from voice-type to text-type when the set output mode is for outputting only text-type information.

According to an embodiment the controller is further configured to convert the communication information received from the external device from text-type to voice-type when the set output mode is for outputting only voice-type information.

According to an embodiment the communication information received from the external device is an image and the controller is further configured to recognize at least one feature of the image based data stored at the mobile terminal, generate voice-type information corresponding to the recognized at least one feature when the set output mode is for outputting only voice-type information, and control the audio output unit to output the generated voice-type information.

According to an embodiment the obtained context information comprises at least location information, schedule information, body information of the user, driving state information, information of people within a proximity to the mobile terminal, a distance between the user and the mobile terminal, or a usage history of the mobile terminal.

According to an embodiment a mobile terminal further includes a camera configured to capture image information, wherein the controller is further configured to obtain the context information from image information captured by the camera.

According to an embodiment the controller is further configured to obtain the body information of the user from image information captured by the camera, and determine whether the user is available to physically interact with the mobile terminal based on the obtained body information, wherein the output mode is set based on the determination result.

According to an embodiment the controller is further configured to recognize at least one face from the image information captured by the camera to determine the information of people within the proximity to the mobile terminal, and wherein the output mode is set based on the recognized at least one face.

According to an embodiment a mobile terminal further includes a microphone, wherein the display is a touch screen and the controller is further configured to set an input mode of the mobile terminal based on the obtained context information, and control at least the microphone or the touch screen to permit receiving of input information to be transmitted to the external device based on the set input mode.

According to an embodiment the controller is further configured to convert the input information received via the microphone or touch screen from a first type to a second type matching a type of the communication information received from the external device.

According to an embodiment the controller is further configured to determine whether the user is available to input information as a voice-type or a text-type based on the obtained context information, and set the input mode based on the determination result.

According to an embodiment the set input mode corresponds to inputting information via only one of the touch screen or the microphone.

According to an embodiment a mobile terminal further includes a learning data unit configured to store data to implement machine learning of context information, wherein the controller is further configured to reference data stored at the learning data unit to process information received via a microphone, a sensor, or a camera of the mobile terminal to obtain the context information.

According to an embodiment the referenced data comprises a plurality of images, a plurality of audio files, or historical usage data of the mobile terminal.

The present disclosure may also include a method of vehicle control using a mobile terminal. According to an embodiment a method of vehicle control using a mobile terminal includes receiving voice information from a talker in a vehicle, determining behavior information of the talker, selecting one of a plurality of passengers in the vehicle as a listener corresponding to the talker based on the determined behavior information, and outputting the received voice information via an audio speaker closest to a position of the listener among a plurality of audio speakers of the vehicle.

According to an embodiment of a method of the present disclosure, the determined behavior information is at least a gaze direction of the talker, a gesture of the talker, or content of the voice information of the talker.

According to an embodiment of a method of the present disclosure, the method further includes recognizing a position of each of the plurality of passengers, and selecting the one of the plurality of passengers as the listener based on a gaze direction of the talker.

According to an embodiment of a method of the present disclosure, the method further includes obtaining a name of each of the plurality of passengers, and selecting the one of the plurality of passengers as the listener based on content of the voice information when the voice information includes a specific name of the one passenger.

According to an embodiment the name of each of the plurality of passengers is obtained using facial recognition based on profile information stored at a learning data unit of the mobile terminal.

According to an embodiment of a method of the present disclosure, the method further includes detecting a presence of an external device corresponding to the selected listener, and transmitting information corresponding to the voice information to the external device to cause information corresponding to the voice information to be output at the external device.

A mobile terminal according to the present invention may output information in a output mode based on a user's current condition or context, thereby improving efficient output functionality of the mobile terminal as well as allowing the user to easily receive communication information received from an external device.

In addition, a mobile terminal according to the present invention may allow a user to input information in various input modes based on a user's current condition or context, thereby improving efficient input functionality of the mobile terminal as well as allowing the user to easily input communication information to be transmitted to an external device.

According to the above effects, a mobile terminal according to the present invention may provide a communication device suitable for a user's context in performing communication with an external device, thereby improving functioning and efficiency of the mobile terminal, as well as increasing user convenience.

Furthermore, according to embodiments of the present invention, input and output modes of the mobile terminal may be implemented to improve communication within a vehicle such that the voices of passengers may be transmitted to other passengers through a speaker, and communication between the passengers may be improved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1A:
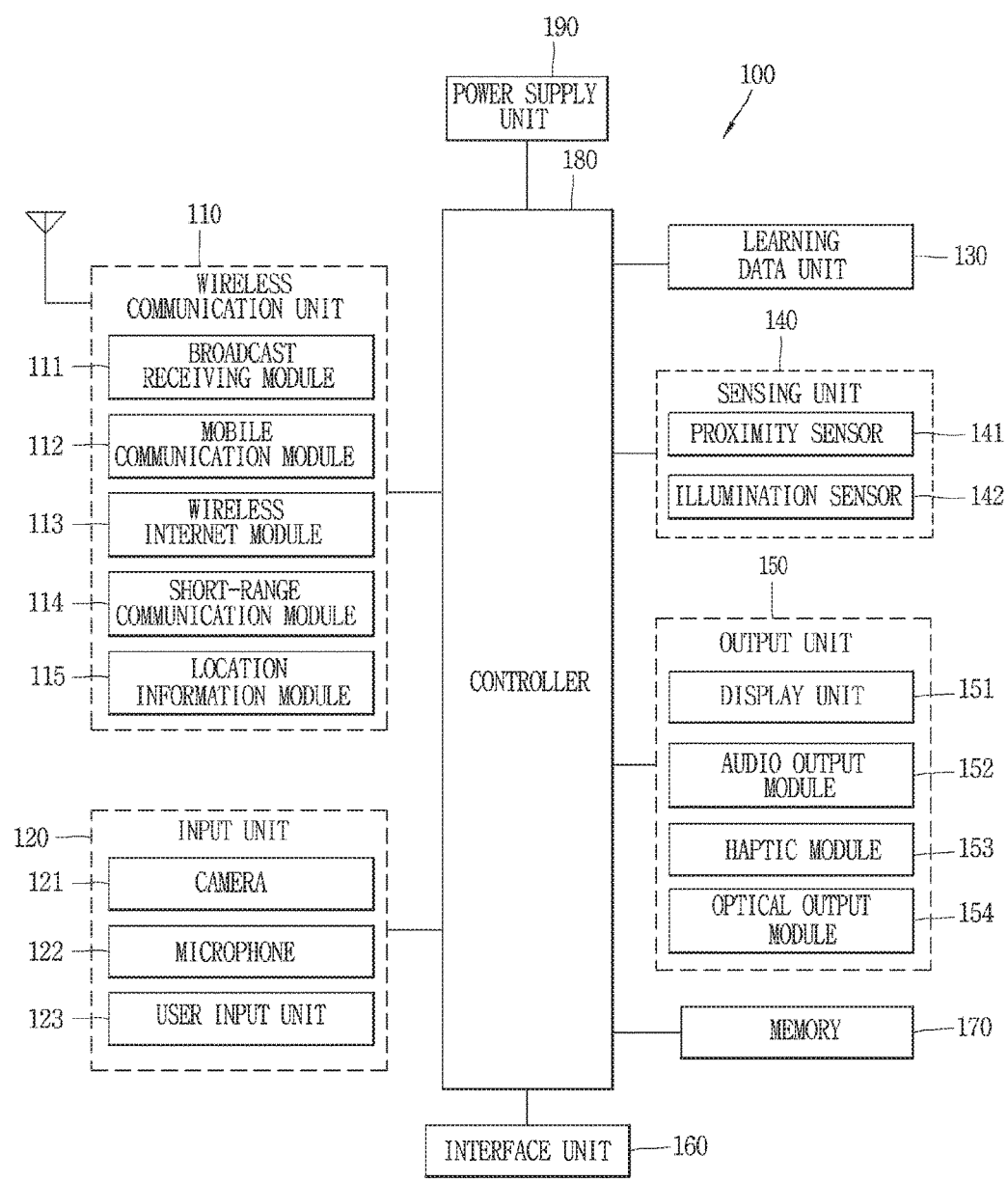
FIG. 1A is a block diagram for explaining a mobile terminal associated with the present disclosure.
Figure 1B:
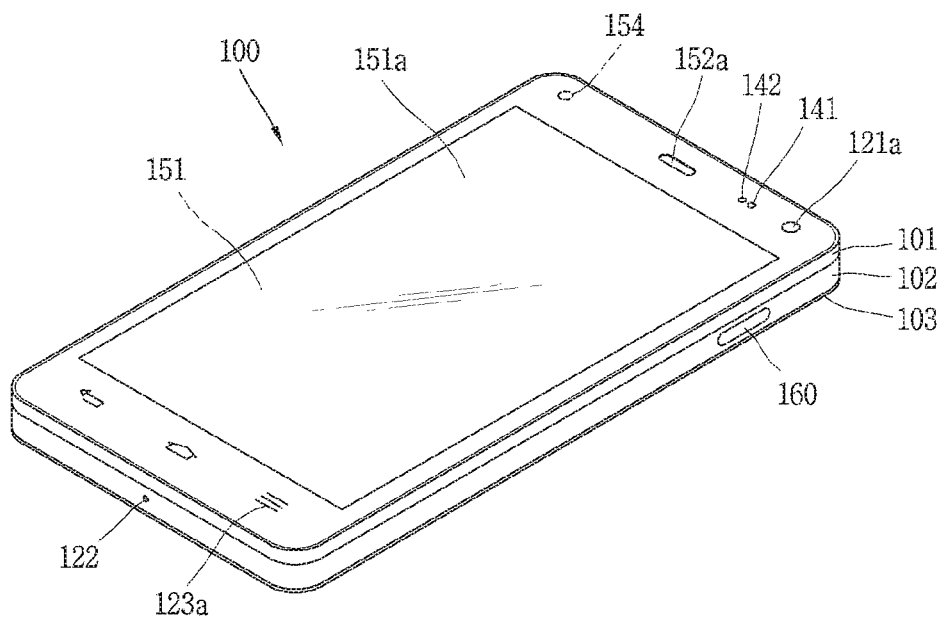
FIGS. 1B and 1C are conceptual views illustrating an example in which a mobile terminal associated with the present disclosure is seen from different directions.
Figure 1C:
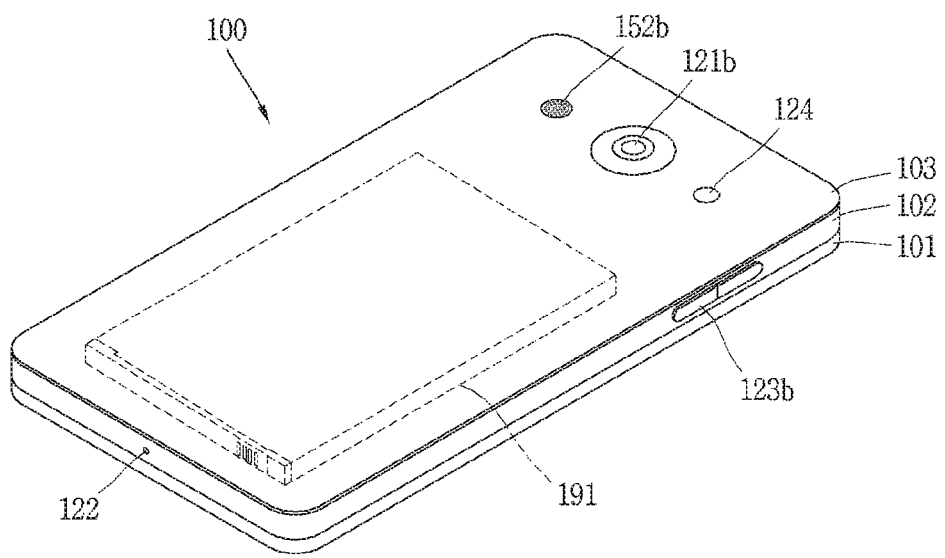

Reference is now made to FIGS. 1A-1C, where FIG. 1A is a block diagram of a terminal in accordance with the present disclosure, FIG. 1B is a perspective view of a front side of a terminal according to an embodiment of the present invention, and FIG. 1C is a rear view of the terminal shown in FIG. 1B.

The terminal 100 may include components, such as a wireless communication unit 110, an input unit 120, learning data unit 130, a sensing unit 140, an output unit 150, an interface unit 160, a memory 170, a controller 180, a power supply unit 190 and the like. FIG. 1A illustrates the terminal having various components, but it is understood that implementing all of the illustrated components is not a requirement, and that greater or fewer components may alternatively be implemented.

In more detail, the wireless communication unit 110 of those components may typically include one or more modules which permit wireless communications between the terminal 100 and a wireless communication system, between the terminal 100 and another terminal 100, or between the terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The learning data unit 130 may be configured to receive, categorize, store, and output information to be utilized for data mining, data analysis, intelligent decision making, and machine learning algorithms and techniques. The learning data unit 130 may include one or more memory units configured to store data that is received, detected, sensed, generated, predefined, or otherwise output by the terminal, or received, detected, sensed, generated, predefined, or otherwise output by another component, device, terminal, or entity in communication with the terminal.

The learning data unit 130 may include memory incorporated or implemented at the terminal. In some embodiments, learning data unit 130 may be implemented using memory 170. Alternatively or additionally, the learning data unit 130 may be implemented using memory associated with the terminal, such as an external memory directly coupled to the terminal or memory maintained at a server in communication with the terminal. In other embodiments, the learning data unit 130 may be implemented using memory maintained in a cloud computing environment, or other remote memory location that is accessible by the terminal through a communication scheme, such as a network.

The learning data unit 130 is generally configured to store data in one or more databases to identify, index, categorize, manipulate, store, retrieve, and output the data for use in supervised or unsupervised learning, data mining, predictive analytics, or other machine learning techniques. The information stored at the learning data unit 130 may be utilized by the controller 180, or one or more other controllers of the terminal, using any of a variety of different types of data analysis and machine learning algorithms and techniques. Examples of such algorithms and techniques include k-Nearest neighbor systems, fuzzy logic (e.g., possibility theory), neural networks, boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may request, retrieve, receive, or otherwise utilize the data of the learning data unit 130 to determine or predict at least one executable operation of the terminal based on the information determined or generated using the data analysis and machine learning algorithms and techniques, and control the terminal to execute a predicted or desired operation among the at least one executable operation. The controller 180 may perform various functions implementing emulation of intelligence (i.e., knowledge based systems, reasoning systems, and knowledge acquisition systems); and including systems for reasoning with uncertainty (e.g., fuzzy logic systems), adaptive systems, machine learning systems, artificial neural networks, and the like.

The controller 180 may also include sub-modules to enable its performance and/or execution involving voice and natural speech language processing, such as an I/O processing module, environment condition module, a speech-to-text (STT) processing module, a natural language processing module, a task flow processing module, and a service processing module. Each of these sub-modules may also have access to one or more systems or data and models at the terminal, or a subset or superset thereof, including scheduling, vocabulary index, user data, task flow models, service models, and automatic speech recognition (ASR) systems. In other embodiments, the controller 180 or other aspects of the terminal may be implemented with said sub-modules, systems, or data and models.

In some examples, based on the data at the learning data unit 130, the controller 180 may be configured to perform detecting and sensing a need based on a contextual condition or a user's intent expressed in a user input or natural language input; actively eliciting and/or obtaining information needed to fully determine a need based on the contextual condition or a user's intent (e.g., by analyzing historical data including historical input and output, pattern matching, disambiguating words, input intentions, etc.); determining the task flow for executing a function in response to the need based on the contextual condition or user's intent; and executing the task flow to meet the need based on the contextual condition or user's intent.

In some embodiments, the controller 180 may implement specific hardware elements dedicated for learning data processes including memistors, memristors, transconductance amplifiers, pulsed neural circuits, artificially intelligent nanotechnology systems (e.g., autonomous nanomachines) or artificially intelligent quantum mechanical systems (e.g., quantum neural networks), and the like. In some embodiments, the controller 180 may include pattern recognition systems such as machine vision systems, acoustic recognition systems, handwriting recognition systems, data fusion systems, sensor fusion systems, and soft sensors. Machine vision systems can also include content based image retrieval, optical character recognition, augmented reality, egomotion, tracking or optical flow, and the like.

The controller 180 may be configured to collect, sense, monitor, extract, detect, and/or receive signals or data, via one or more sensing components at the terminal, in order to collect information for processing and storage at the learning data unit 130 and for use in data analysis and machine learning operations. Collection of information may include sensing information through a sensor, extracting information stored in the memory, such as memory 170, or receiving information from another terminal, entity, or an external storage through communication means. Thus in one example, the controller 180 may collect historical usage information at the terminal, store the historical usage information for use in data analytics, and at a future occurrence, determine a best match for executing a particular function using predictive modeling based on the stored historical usage information.

The controller 180 may also receive or sense information of the surrounding environment, or other information, through the sensing unit 140. In addition, the controller 180 may receive broadcast signals and/or broadcast-related information, wireless signals, wireless data, and the like through the wireless communication unit 110. The controller 180 may also receive image information (or a corresponding signal), audio information (or a corresponding signal), data, or user-input information from an input unit.

The controller 180 may collect information in real time, and process or categorize the information (for example, in a knowledge graph, command policy, personalization database, dialog engine, etc.), and store the processed information in the memory 170 or the learning data unit 130.

When the operation of the terminal is determined based on data analysis and machine learning algorithms and techniques, the controller 180 may control the components of the terminal to execute the determined operation. The controller 180 may then execute the determined operation by controlling the terminal based on the control command.

In some embodiments, when a specific operation is executed, the controller 180 may analyze history information indicating the execution of the specific operation through data analysis and machine learning algorithms and techniques and execute updating of previously-learned information based on the analyzed information. Accordingly, the controller 180, in combination with the learning data unit 130, can improve the accuracy of future performance of the data analysis and machine learning algorithms and techniques based on the updated information.

The sensing unit 140 may include at least one sensor which senses at least one of internal information of the terminal, a surrounding environment of the terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the terminal 100 and a user, as well as functioning as the user input unit 123 which provides an input interface between the terminal 100 and the user.

The interface unit 160 may serve as an interface with various types of external devices connected with the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

The memory 170 may store a plurality of application programs (or applications) executed in the terminal 100, data for operations of the terminal 100, instruction words, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Terminal 100 is shown implemented with one controller 180 facilitating operation of all of the various units (e.g., wireless communication unit 110, input unit 120, learning data unit 130, sensing unit 140, output unit 150, interface unit 160, etc.) and submodules shown in the figure. However, one or more separate controllers 180 may alternatively be implemented for any or all of such units and submodules.

Furthermore, the controller 180 may control at least part of the components illustrated in FIG. 1A, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

At least part of those elements and components may be combined to implement operation and control of the terminal or a control method of the terminal according to various exemplary embodiments described herein. Also, the operation and control or the control method of the terminal may be implemented in the terminal in such a manner of activating at least one application program stored in the memory 170.

Hereinafter, each aforementioned component will be described in more detail with reference to FIG. 1A, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like). The wireless signals may include audio call signal, video (telephony) call signal, or various formats of data according to transmission/reception of text/multimedia messages.

The wireless Internet module 113 denotes a module for wireless Internet access. This module may be internally or externally coupled to the terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the terminal 100 and a wireless communication system, between the terminal 100 and another terminal 100, or between the terminal and a network where another terminal 100 (or an external server) is located, via wireless personal area networks.

Here, the another terminal 100 may be a wearable device, for example, a smart watch, smart glasses or a head mounted display (HMD), which is able to exchange data with the terminal 100 (or to like data with the terminal 100). The short-range communication module 114 may sense (recognize) a wearable device, which is able to communicate with the terminal), near the terminal 100. In addition, when the sensed wearable device is a device which is authenticated to communicate with the terminal 100 according to the present disclosure, the controller 180 may transmit at least part of data processed in the terminal 100 to the wearable device via the short-range communication module 114. Hence, a user of the wearable device may use the data processed in the terminal 100 on the wearable device. For example, when a call is received in the terminal 100, the user may answer the call using the wearable device. Also, when a message is received in the terminal 100, the user may check the received message using the wearable device.

The location information module 115 denotes a module for detecting or calculating a position of the terminal. An example of the location information module 115 may include a Global Position System (GPS) module or a Wi-Fi module. For example, when the terminal uses the GPS module, a position of the terminal may be acquired using a signal sent from a GPS satellite. As another example, when the terminal uses the Wi-Fi module, a position of the terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal. As a module used to acquire the location (or current location) of the terminal, the location information module 115 may not be necessarily limited to a module for directly calculating or acquiring the location of the terminal.

Next, the input unit 120 may be configured to provide an audio or video signal (or information) input to the terminal or information input by a user to the terminal. For the input of the audio information, the terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the terminal 100 to correspond to the input information. The user input unit 123 may include a mechanical input element (or a mechanical key, for example, a button located on a front/rear surface or a side surface of the terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the terminal, surrounding environment information of the terminal and user information, and generate a sensing signal corresponding to it. The controller 180 may control an operation of the terminal 100 or execute data processing, a function or an operation associated with an application program installed in the terminal based on the sensing signal. Hereinafter, description will be given in more detail of representative sensors of various sensors which may be included in the sensing unit 140.

First, a proximity sensor 141 refers to a sensor to sense presence or absence of an object approaching a surface to be sensed, or an object disposed near a surface to be sensed, by using an electromagnetic field or infrared rays without a mechanical contact. The proximity sensor 141 may be arranged at an inner region of the terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the sensor based on the light as a reference signal.

The camera 121 of the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 170 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the terminal 100. The audio output unit 152 may include a receiver, a speaker, a buzzer or the like.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the terminal 100.

An optical output unit 154 may output a signal for indicating an event generation using light of a light source. Examples of events generated in the terminal 100 may include a message reception, a call signal reception, a missed call, an alarm, a schedule notice, an email reception, an information reception through an application, and the like. A signal output by the optical output unit 154 may be implemented in such a manner that the terminal emits monochromatic light or light with a plurality of colors. The signal output may be terminated as the terminal senses a user's event checking.

The interface unit 160 may serve as an interface with every external device connected with the terminal 100. For example, the interface unit 160 may receive data transmitted from an external device, receive power to transfer to each element within the terminal 100, or transmit internal data of the terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the terminal 100 is connected with an external cradle, the interface unit 160 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 170 over the Internet or other network.

As aforementioned, the controller 180 may typically control the general operations of the terminal 100. For example, the controller 180 may set or release a lock state for restricting a user from inputting a control command with respect to applications when a state of the terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may receive external power or internal power and supply appropriate power required for operating respective elements and components included in the terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, certain embodiments described herein may be implemented with separate software modules, such as procedures and functions, each of which perform one or more of the functions and operations described herein. The software codes can be implemented with a software application written in any suitable programming language and may be stored in memory (for example, memory 170), and executed by a controller or processor (for example, controller 180).

Referring to FIGS. 1B and 1C, the terminal 100 disclosed herein may be implemented using a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of terminal or on a specific type of terminal will be also typically applied to another type of terminal. The terminal body may be formed using at least one assembly.

The terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the terminal 100 may be configured such that one case forms the inner space. In this example, a terminal 100 having a uni-body formed in such a manner that synthetic resin or metal extends from a side surface to a rear surface may also be implemented.

On the other hand, the terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1B), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the terminal 100 may further be provided on the terminal 100. As one example of the accessory, a cover or pouch for covering or accommodating at least one surface of the terminal 100 may be provided. The cover or pouch may cooperate with the display unit 151 to extend the function of the terminal 100. Another example of the accessory may be a touch pen for assisting or extending a touch input onto a touch screen.

When the wireless communication unit 110, the input unit 120, and the output unit 150 included in the foregoing mobile terminal is used, various types of communication can be carried out with an external device. The input unit 120 receives communication information from a user. The wireless communication unit 110 transmits information received through the input unit 120 to an external device, and receives communication information transmitted from an external device. The output unit 150 outputs communication information received from an external device.

According to the present specification, communication information is defined as all types of information transmitted and received to perform communication between a mobile terminal and an external terminal. Here, the communication information may have various types. For example, the communication information may be at least one of voice information, image information, and text information, but may not be necessarily limited to this. The type of communication information may vary depending on its communication method. Specifically, when the communication method is a method using an auditory device, the communication information is voice information, and when the communication method is a method using a visual device, the communication information may be at least one of image information and text information.

Meanwhile, according to the present specification, a signal transmitted and received between phone call terminals is also defined as communication information.

On the other hand, communication information may be input to a different input device depending on its type. For example, each of the voice information, video information, and text information may be input by the microphone 122, camera 121, and touch screen 151, respectively. Specifically, the voice information may be input through the microphone 122, and the video information may be input through the camera 121, and the text information may be input through the touch screen 151.

On the other hand, communication information may be output to a different output device depending on the type of the information. For example, voice information may be output through a speaker, and video information and text information may be output through the display unit 151. The display unit 151 may be represented by a touch screen 151 depending on whether the touch sensor 151 is provided therein. According to this specification, the display unit 151 is represented by the touch screen 151 for the sake of convenience of explanation, but the display unit 151 does not necessarily have a touch sensor in an embodiment in which a user's touch input is not required.

As described above, the mobile terminal uses a different input and output device depending on its communication method. Here, the communication method is determined by an entity that generates a communication event.

According to the present specification, a communication event is defined as an event that is a starting point of communication using a mobile terminal, or an event of receiving communication information itself.

For example, when a communication event is a starting point of communication, the communication event may be an event of receiving a call signal for a call connection from an external device. At this time, the communication information may be received only when there is a user request for a communication event. For example, when receiving a call signal from an external device, the mobile terminal may receive voice information only when there is a user's call connection request.

On the other hand, when the communication event is an event of receiving communication information itself, for example, the communication event may be an event of receiving an image or text message from an external device.

The type of the communication information is determined according to a type transmitted from the external device that has generated the communication event.

In the related art, a mobile terminal has output information in the type of communication information received from an external device. For example, when the mobile terminal receives communication information consisting of voice information from an external device, the mobile terminal outputs the received voice information using the audio output unit 152. Accordingly, when a user is unable to use an information output mode corresponding to the communication information received from the external device in a specific context, the user may not perform communication with the external device.

Meanwhile, in the related art, a mobile terminal may convert and output a type of communication information received from an external device, but the user has to directly authorize an information type conversion request. Accordingly, there has been a problem that the user is unable to request a change of the type of communication information in a situation where the user is unable to recognize the occurrence of a communication event or unable to operate the mobile terminal.

In order to solve the foregoing problems, the present disclosure provides a mobile terminal capable of determining a user's current situation to allow the user to perform communication with an external device in a currently available communication mode.

Hereinafter, a control method of a mobile terminal according to the present disclosure will be described.

Figure 2:
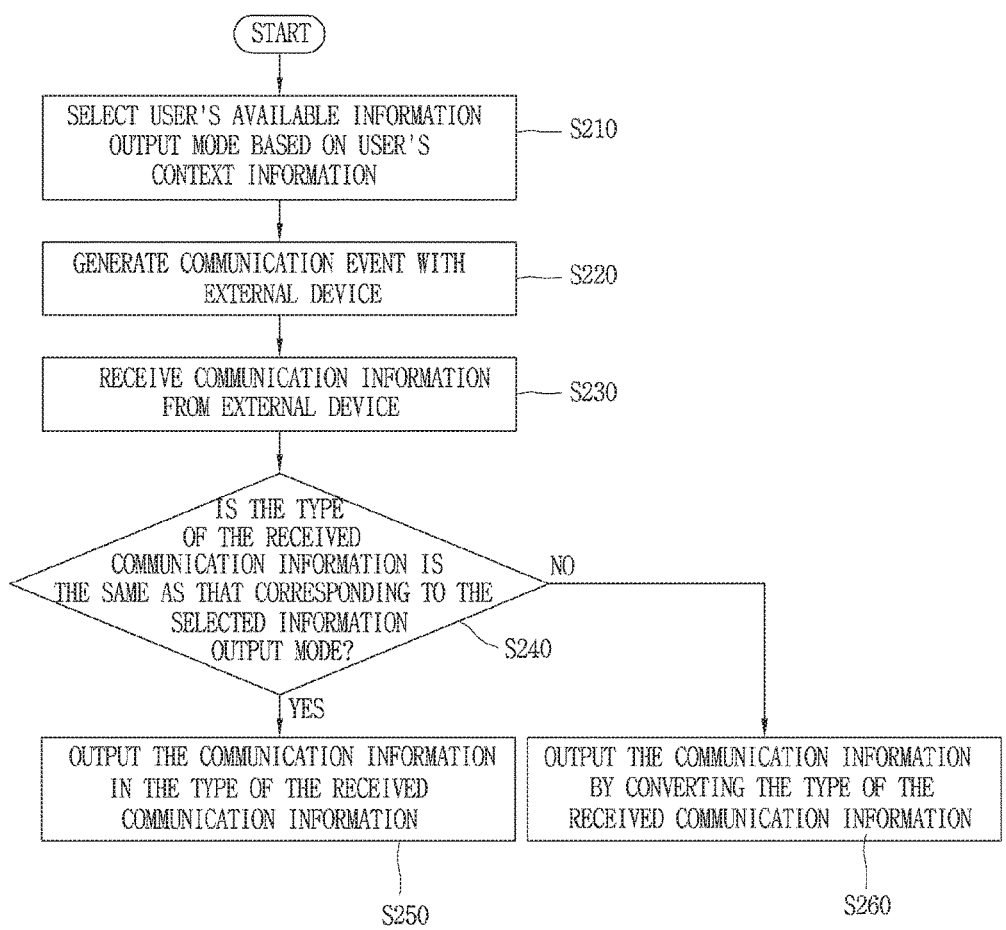
FIG. 2 is a flow chart illustrating a control method of a mobile terminal according to an embodiment of the present disclosure.

FIG. 2 is a flow chart illustrating a control method of a mobile terminal according to an embodiment of the present disclosure.

First, in a mobile terminal according to the present disclosure, the process (S210) of selecting a user's available information output mode based on the user's context information is carried out.

Here, the context information is information that defines characteristics of at least one of a person, a place, a thing, an object, and a time that affects an interaction between the user and another user, system, or application of the device. Specifically, the context information may include a computing context including at least one of a network connection status, a communication bandwidth, status of the touch screen 151, a user context associated with a user's profile, position and surrounding people, a physical context including at least one of illumination, a noise level, a traffic condition, and a temperature, and a time context including at least one of a time, a week, a month, and a season.

The learning data unit 130 may store context information obtained through constituent elements included in a mobile terminal, and the controller may determine the user's situation based on at least one of the collected context information. According to the present disclosure, the controller may determine a user's available information output mode based on the collected context information.

The information output mode is a mode of allowing the mobile terminal to output communication information received from an external device, and the controller 180 outputs communication information using at least one of the audio output unit 152 or the touch screen 151. Meanwhile, the present disclosure may not be necessarily limited to this, and the controller 180 may allow the communication information to be output from a third device adjacent to the user other than the mobile terminal.

Specifically, the information output mode may include a mode in which only a specific type of information is output in a limited fashion. For example, the information output mode may include a mode of outputting only auditory information or a mode of outputting only visual information.

In addition, the information output mode may include a mode of using only a specific constituent element included in the mobile terminal. For example, the information output mode may include a mode in which communication information is output from only one of a receiver or a speaker included in the audio output unit 152.

In an embodiment, the controller 180 determines whether the user is in a situation capable of receiving visual information or in a situation capable of receiving auditory information based on the collected context information, and select the type of information to be output. In addition, the controller 180 may select a constituent element of the mobile terminal to output information based on the determination result. A specific embodiment of selecting an information output mode will be described later.

The controller 180 collects context information in real time for storage in the learning data unit 130 or other memory, and the controller may change the information output mode according to the user's situation. In other words, the controller 180 may perform step S210 not only prior to performing communication with an external device, but also during or subsequent to steps S220 and S230 which will be described later.

Next, the operation (S220) of generating a communication event related to an external device is carried out.

Here, the operation S220 may be generated by an external device that performs communication with the mobile terminal. When a communication event occurs, the controller 180 may output a notification for guiding the occurrence of the communication event.

Here, the notification output may be carried out by a method that is set by a user, and at least one of the touch screen 151, the haptic module 153, or the speaker may be used for the notification output.

Meanwhile, a constituent element of the mobile terminal used for a preset notification output may be different from that used for an information output mode selected by the controller. In this case, the controller may change a notification output mode according to the selected information output mode.

For example, the preset notification output mode is a mode using a speaker, and an information output mode selected by the controller and the learning data unit 130 may be a mode in which only visual information except auditory information is output. In this case, the controller may change the notification output mode to use at least one of the touch screen 151 or the haptic module instead of the speaker. However, the present disclosure may not be necessarily limited to this, and the controller may not change the notification output mode that is set by the user.

Next, the operation (S230) of receiving communication information from an external device may be carried out.

The operation S230 may be carried out according to a user's request or carried out regardless of the user's intention.

For example, when a user authorizes a connection request for a call signal, the mobile terminal starts to receive communication information from an external device. When the user rejects a connection request for the call signal, the mobile terminal does not receive the communication information from the external device.

For another example, a text message transmitted from an external device is received regardless of the user's intention, except a case where the user has separately set a reception rejection.

Meanwhile, the operations S220 and S230 may be simultaneously performed. In other words, an event of receiving communication information from an external device itself may be a communication event.

Next, the controller 180 may determine whether the type of communication information received from the external device is the same as that corresponding to a selected information output mode in operation (S240), and according to the determination result, output the the received communication information as received (S250) or convert the received communication information and output the converted information (S260).

The controller 180 may output communication information received from an external device using at least one of the touch screen 151 or the audio output unit 152.

On the other hand, a constituent element available for the information output may vary according to a selected information output mode. For example, when the selected information output mode is set to output only visual information, the controller 180 outputs communication information using only the touch screen 151.

On the other hand, when a specific constituent element is selected for outputting information, the controller 180 outputs information via only the specific constituent element.

When the type of the received communication information is the same as that of the selected information output mode based on context information stored in the learning data unit 130, the controller 180 outputs the received information in the type of the received communication information.

On the contrary, the type of the received communication information may be different from that of the selected information output mode. For example, the type of the communication information received from the external device may be a text message, and the selected output mode may be for voice information.

At this time, the controller 180 may be unable to output the received information as received due to the difference with the selected output mode. In this case, the controller 180 may convert the received communication information to the type of information corresponding to the selected information output mode, and outputs the converted information. Accordingly, the present disclosure may output communication information in a user's available information output mode based on contextual information.

In the above, a control method of a mobile terminal capable of changing an output mode of communication information according to a user's context or situation has been described.

Hereinafter, a specific embodiment of selecting an information output mode will be described.

Figure 3:
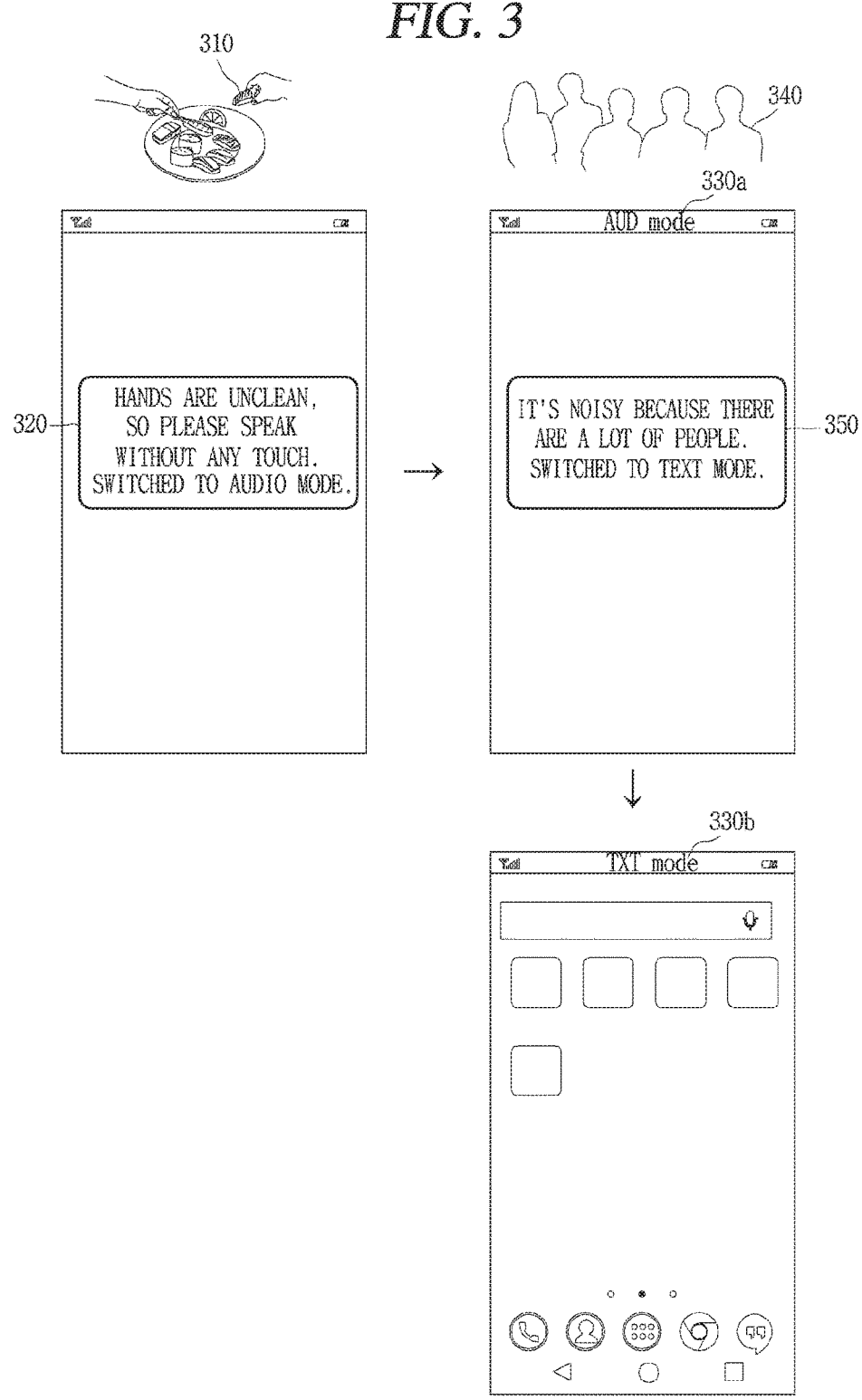
FIG. 3 is a conceptual view illustrating an embodiment of allowing an learning data unit to select an information output mode.
Figure 4:
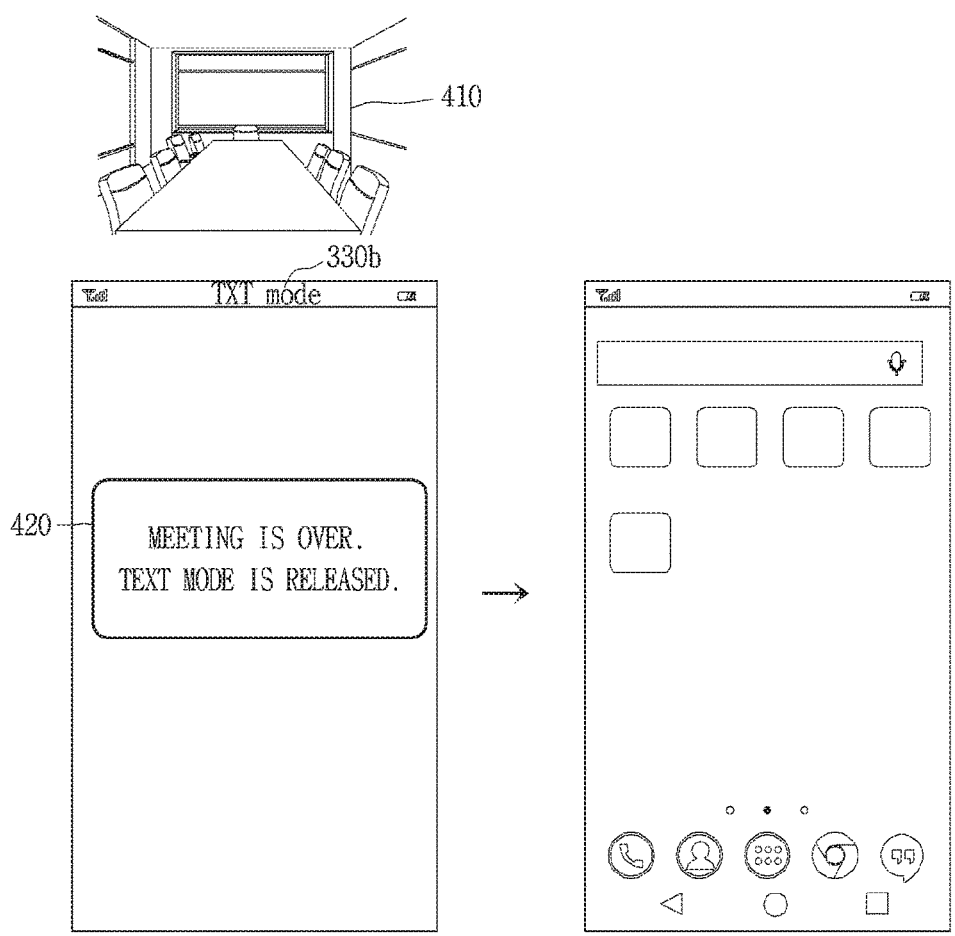
FIG. 4 is a conceptual view illustrating an embodiment of allowing the learning data unit to release a preset information output mode.

FIG. 3 is a conceptual view illustrating an embodiment of selecting an information output mode, and FIG. 4 is a conceptual view illustrating an embodiment of releasing a selected information output mode.

The learning data unit 130 may collect and/or store contextual information using a constituent element included in the mobile terminal. Here, information collected may include at least one of a user's current position, a user's schedule, a user's physical condition, the driving state information of a mobile terminal, surrounding people, a distance between the user and the mobile terminal, a user's past usage history of the mobile terminal, and the like.

The controller may determine a suitable information output mode using at least one of the collected context information.

For example, the controller may calculate a number of times a certain information output mode is used when the user performs a specific schedule or is at a specific location based on at least one of the user's schedule information, the location information of the mobile terminal, the user's usage history of the terminal, and the like, where this information is categorized, tagged, and/or stored at the learning data unit. The learning data unit 130 may provide information for determining a priority of various information output modes corresponding to the user's schedule or location based on the historical information. Then, the controller may select an information output mode according to a specific schedule or an information output mode at a specific location based on the determined priority.

For example, when a rate of text messages at a specific location is above a predetermined level, based on historical information categorized, tagged, and/or stored at the learning data unit, the controller may select a text only output mode when the user enters the specific location.

In another example, images of a user's body may be captured through the camera 121, and the controller may determine the user's physical condition using the captured image. Here, the physical condition may include whether the body is clean or dirty, such as where a substance on the body appears on the image, the user's gaze direction, or the user's emotional state, but the present disclosure may not be necessarily limited thereto. The controller may determine whether the user is able to touch or contact the mobile terminal, whether the user is able to view the touch screen 151 of the mobile terminal, whether the user is able to talk, or the like, based on the determined body condition. Based on the determination result, the controller may select an information output mode.

In yet another example, a distance between the mobile terminal and the user may be calculated, and the controller may use the user's behavior pattern in combination with the distance between the mobile terminal and the user to select an output mode. For example, when the user is determined to be away from the mobile terminal by a predetermined distance, the controller analyzes a user's response speed, or response or non-response according to a volume of a notification sound, and based on this, determines the user's cognitive ability when a distance between the mobile terminal and the user is greater a predetermined distance. A level of sound output from the audio output unit 152 may be selected based on the user's cognitive ability.

Referring to FIG. 3, an embodiment of selecting an information output mode according to a user's physical condition and an embodiment of selecting an information output mode according to a user's surrounding companions will be described.

Referring to FIG. 3, a user's body 310, or a portion thereof, may be captured by a camera or the mobile terminal. Using the captured image, the controller may determine whether or not the body part is clean or dirty, or has a foreign substance on it. For example, in FIG. 3, a hand of a user may be shown in the captured image with food substances on the fingers and other parts of the hand. The controller may determine that the hand is dirty using images categorized, tagged, and stored at the learning data unit. The stored images may be previously stored based on images captured by the mobile terminal, or the stored images may be retrieved from another image source, such as the Internet, or other image source in direct communication with the mobile terminal, or connected via a network. In this case, the controller may select an information output mode to allow the user to perform communication without touching or making contact with the mobile terminal since the user is unable to touch the touch screen or other portions of the mobile terminal without dirtying the device.

Specifically, the controller may select an information output mode in which communication information is output only from the audio output unit (hereinafter, referred to as an "AUD mode") to allow the user to perform communication without making contact with the mobile terminal.

When the AUD mode is selected, a guide message 320 is displayed on the touch screen 151, and a graphic object 330a for guiding a currently set information output mode may be displayed thereon. However, when the information output mode is selected, the touch screen 151 is not required to be in an ON state. Therefore, the graphic object 330a for guiding the information output mode may not be necessarily displayed.

Meanwhile, the user's context information may be continually collected and analyzed in real time, and the information output mode may be changed when it is determined that the user's context has changed.

Referring to FIG. 3, the sound around the mobile terminal may also be captured through the microphone 122. The controller may also perform facial recognition, using the learning data unit, to recognize a person's face from an image captured through the camera 121 or a level of background noise may also be calculated based on the sound received through the microphone 122.

When a plurality of people around the mobile terminal are detected from an image captured by the camera 121 while the information output mode is set to an AUD mode, or when a degree of background noise exceeds a predetermined level, the controller may determine that the user is unable to receive auditory information as the surrounding environment is too loud. Based on this, the information output mode may be changed to a mode in which communication information is only displayed as text (hereinafter referred to as a "TXT mode"). Accordingly, a message 350 indicating a change of the information output mode is displayed, and a graphic object 330b for indicating the currently set information output mode is changed.

On the other hand, as described above, the graphic object for indicating the information output mode or the change of the mode may not be necessarily displayed. In other words, all the processes described in FIG. 3 may be carried out while the touch screen 151 is in an OFF state.

On the other hand, when a preset condition is satisfied, the selected information output mode may be released and a previous mode may be reactivated.

For example, the preset condition may include when a user is able to use all the information output modes executable on the mobile terminal, or when there is a specific user request to change the mode, or when a user's specific situation ends, but the present disclosure may not be necessarily limited thereto.

In other words, when a user is able to use all information output modes executable on the mobile terminal, there is no need to limit any of the information output modes. The controller may release the limitation to the previously selected information output mode when it is determined that the user is able to use all functions or features of the mobile terminal, or for example, effectively receive both visual information and auditory information.

On the other hand, when it is determined that a selected information output mode is inapplicable, the user may change or cancel the selection of the information output mode through a voice command or preset touch input.

Meanwhile, when a specific situation ends while an information output mode corresponding to the specific situation is set, the controller may release the selection of the information output mode corresponding to the specific situation.

For example, referring to FIG. 4, the controller may select a TXT mode when it is determined that the user is in a meeting based on schedule information stored in the mobile terminal. The controller may also make this determination based on images captured by the camera, or also may make this determination based on location information. Data stored in the learning data unit may be referenced to determine that the user is in a meeting, for example, by comparing categorized, stored, and/or tagged historic scheduling information, location information, or captured image information.

Then, the TXT mode may be released when the meeting has ended (based on scheduling information, location information, and the like as discussed) and a message 420 may be output indicating that the meeting is over (410) and that the TXT mode has been released. Thereafter, any information may be output at the mobile terminal in its native format.

In the above, embodiments of changing an information output mode based on a user's context information have been described.

Hereinafter, embodiments of outputting communication information when the information output mode is different from a type of communication information received from an external device will be described.

Figure 5:
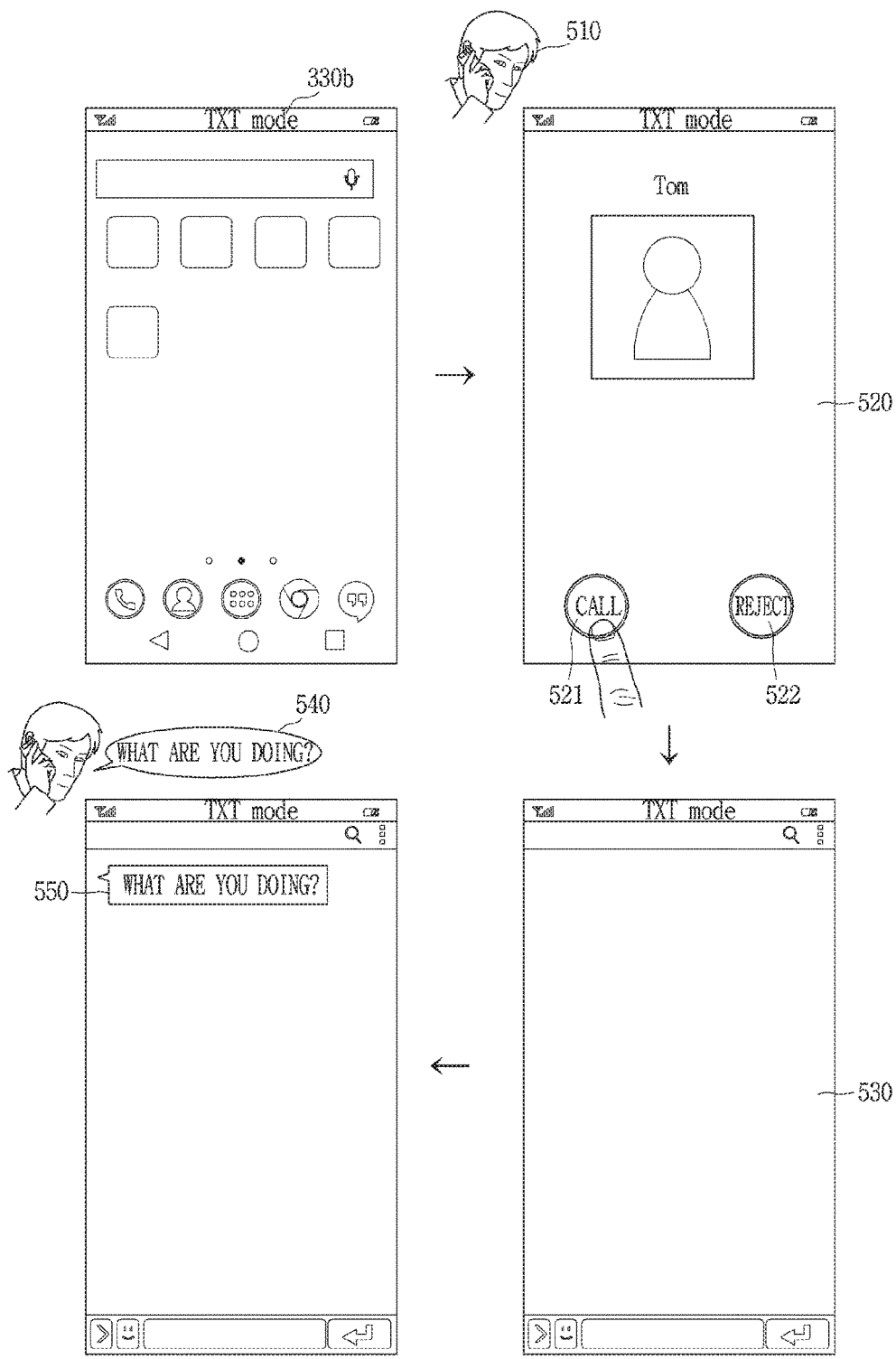
FIG. 5 is a conceptual view illustrating an embodiment of converting voice information received from an external device into a text to output the text.
Figure 6:
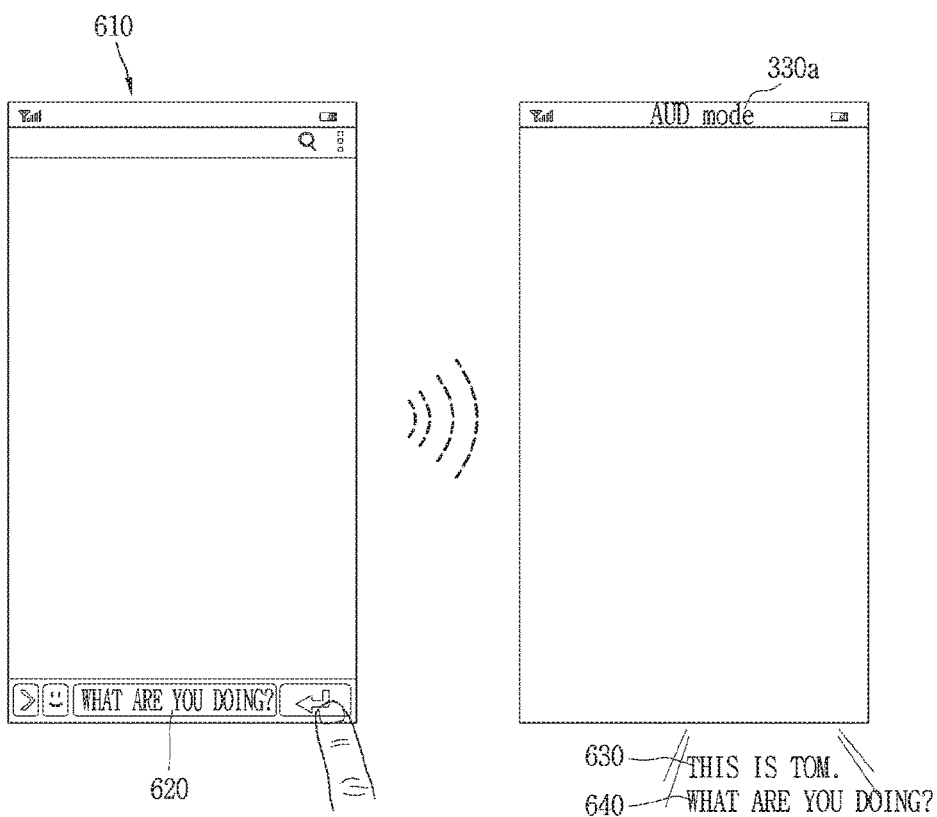
FIG. 6 is a conceptual view illustrating an embodiment of converting text information received from an external device into voice information to output the voice information.
Figure 7:
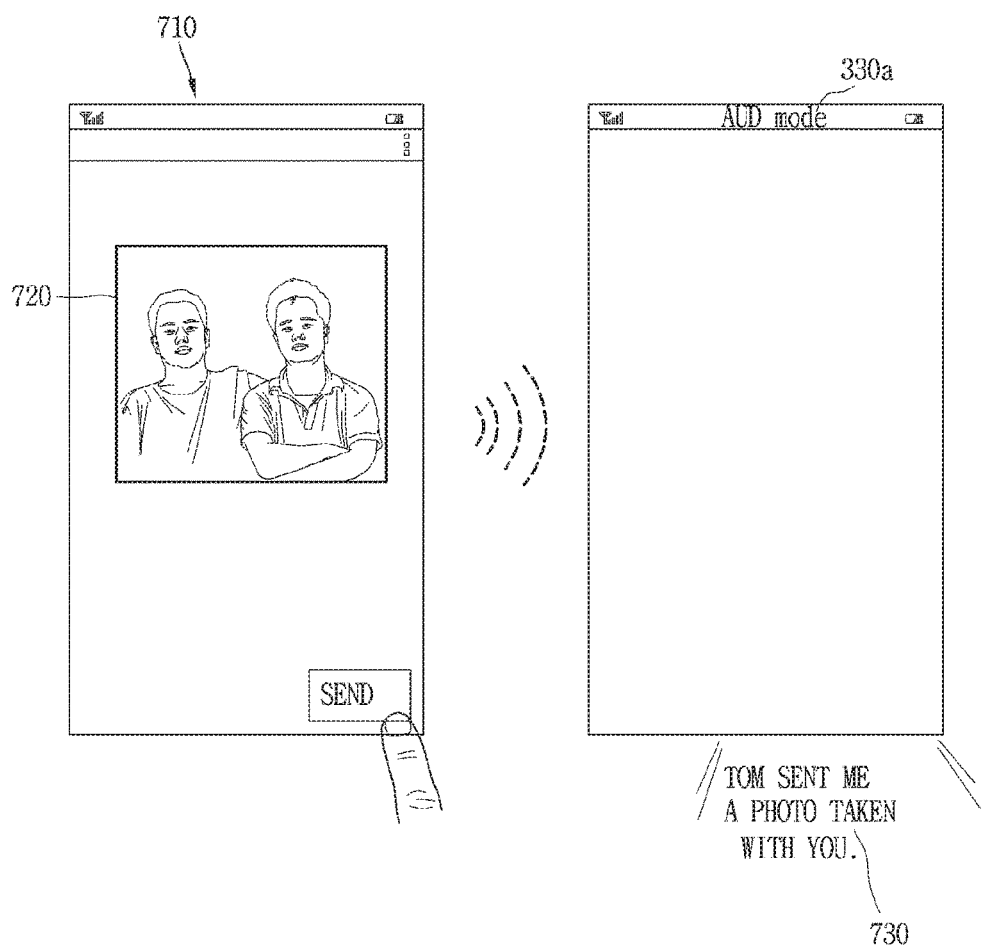
FIG. 7 is a conceptual view illustrating an embodiment of converting image information received from an external device into voice information to output the voice information.

FIG. 5 is a conceptual view illustrating an embodiment of converting voice information received from an external device into a text to output the text, and FIG. 6 is a conceptual view illustrating an embodiment of converting text information received from an external device into voice information to output the voice information, and FIG. 7 is a conceptual view illustrating an embodiment of converting image information received from an external device into voice information to output the voice information.

Cases where the type of information corresponding to a selected information output mode is different from communication information received from an external device may be classified into three categories.

For example, the controller 180 may output voice information received from an external device as text, or the controller may output text information received from an external device as voice, or the controller may output video information received from an external device as voice or text information.

For example, where voice information received from an external device is output as text with reference to FIG. 5, when a call signal is received from the external device 510 in a state where the mobile terminal is set to a TXT mode, screen information 520 indicating an incoming call from a specific external device and graphic objects 521, 522 corresponding to call connection or rejection options may be displayed.

When a user touches a graphic object corresponding to connecting an incoming call while the mobile terminal is in a TXT mode, an execution screen 530 of a messenger application may be displayed on the touch screen 151. In other words, when a call is connected to an external device the TXT mode, the user is provided with a screen to perform text based communication for transmitting and receiving text-type information.

During the call connection, when voice information 540 is received from the external device, the controller 180 may convert the received voice information into text information to display (550) the converted text information on the execution screen of the messenger application. Through this, the present disclosure may allow the user to check the content of the voice information received from the external device even when the user is unable to receive auditory information while in the TXT mode.

In another example, an embodiment of outputting text information 620 received from an external device 610 as voice information is discussed with reference to FIG. 6. When a message is received from an external device while the mobile terminal is set to an AUD mode, the controller 180 may convert the text message received from the external device into voice information and outputs the voice information.

At this time, the controller 180 may output automatically generated voice information 630 ("This is TOM") for indicating a source of the text message. This may be based on the contact information associated with the incoming text message. the converted voice information 640 may then be output as voice information.

Meanwhile, the learning data unit 130 may collect, categorize, tag, and/or store speech patterns of various users of external devices from previous call records, and may provide information for effectively converting the text message into voice information.

Here, the speech pattern of the output voice information may include an intonation, a pronunciation, a speech speed, a colloquial expression, and the like specific to the user of the external device based on information provided by the learning data unit. The controller 180 may apply speech patterns collected by the learning data unit 130 to output voice information similar to the voice of the user of the external device.

As illustrated in FIG. 6, the controller and/or learning data unit 130 may recognize the meaning of a text message received from an external device, and extract a voice of the external device user having the same meaning as the recognized meaning from previous phone call records between the user and the external device user. Then, the controller 180 outputs the extracted voice of the external device user.

As illustrated in FIG. 6, the controller may convert a text message received from an external device into voice information with colloquial expressions 640 or the like of an external device user and outputs the converted voice information.

In yet another example, an embodiment of outputting image information 720 received from an external device 710 as voice or text information will be discussed with reference to FIG. 7. When image information is received from the external device while the mobile terminal is set to an AUD mode, the controller may recognize, using the learning data unit, the context of the received image information, and generate voice information based on the recognized context.

Here, recognizing the context of the image information may include abstracting dynamic, internal, static contexts included in the image information. The learning data unit 130 may enhance the context recognition capability in image information processing, through machine learning and training based on a large number of stored images or images provided by an external image source.

Context recognized from the image processing may include at least one of who was captured in the image, what was captured, what scene was captured, or when it was captured, but the present disclosure is not limited thereto.

Specifically, using the learning data unit, a specific person may be recognized from the image information, a specific object may be recognized, detailed information of a scene included in the image information may be recognized (for example, an image of a sunny day or a rainy day) or time information may be extracted from the image information to analyze a time at which the image is captured.

For example, describing an embodiment of recognizing a person in an image with reference to FIG. 7, the controller and/or learning data unit 130 may recognize a face from image information received from an external device. Then, the controller and/or learning data unit 130 may compare a portrait uploaded to a user's social network service, a face image included in contact information stored in the mobile terminal, and the like with a face recognized from the image information received from the external device to recognize "who is captured" from the image information.

When a face of the user and a face of the user of the external device are recognized from the image information, the controller, using the learning data unit, may generate voice information for an audible description of the received pictures on which the face of the user and the face of the user of the external device appear, and the controller 180 may output the generated voice information. Then, a voice message 730 describing the image information received from the external device is output from the mobile terminal.

As described above, a mobile terminal according to the present disclosure may output communication information received from an external device with an information output mode suitable for a user's available context.

In the above, a specific embodiment of outputting communication information when a selected information output mode is different from a type of communication information received from an external device has been described.

Meanwhile, a mobile terminal according an embodiment of the present disclosure may also provide an information input mode suitable for a user's context.

Hereinafter, an embodiment of a mobile terminal configured to change an information input mode based on a user's context will be described.

Figure 8:
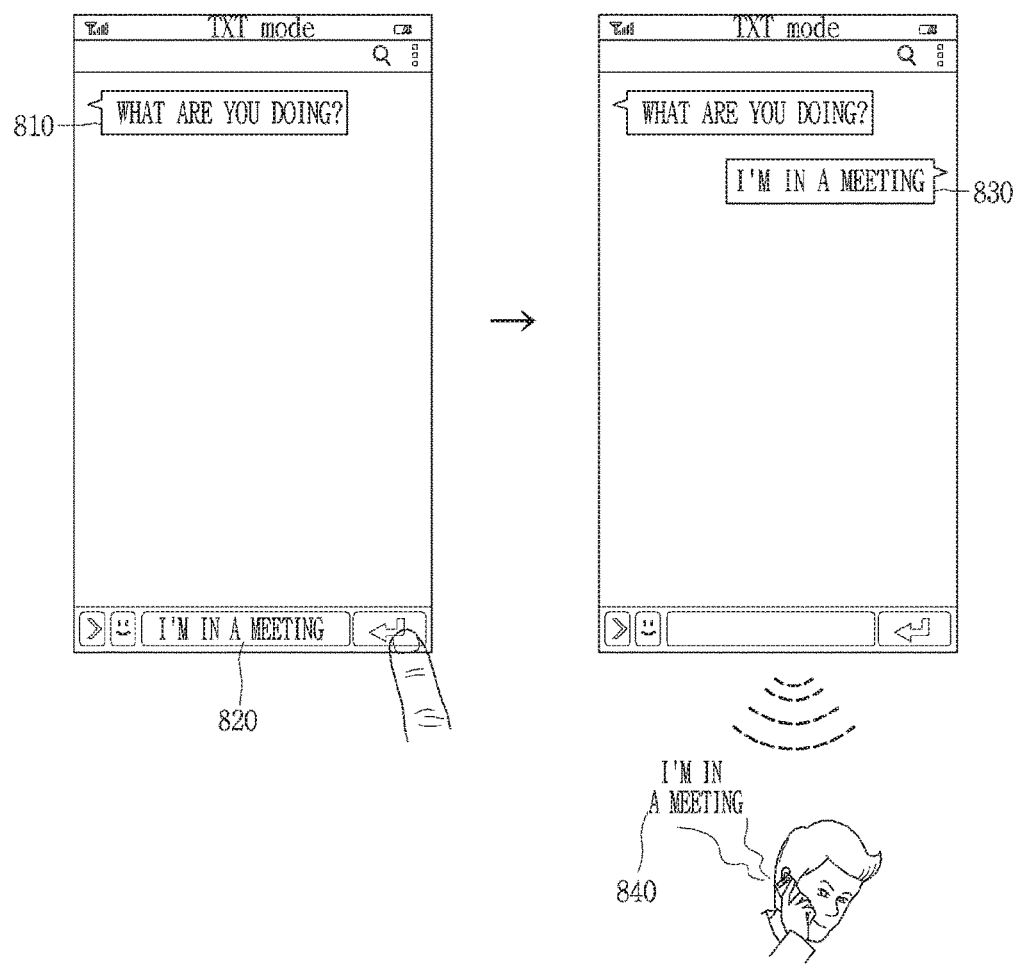
FIG. 8 is a conceptual view illustrating a text-type communication information input mode.
Figure 9:
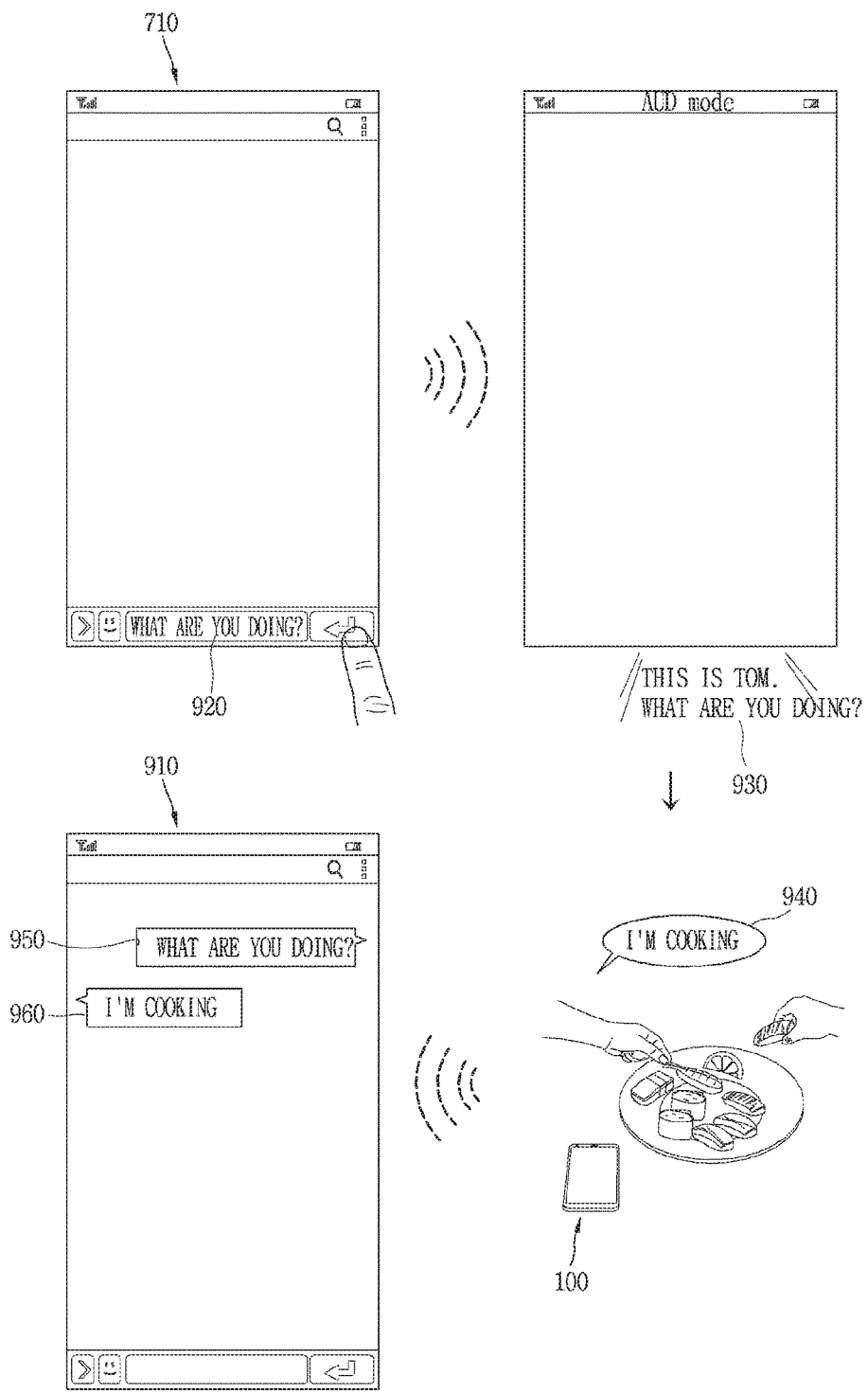
FIG. 9 is a conceptual view illustrating a voice-type communication information input mode.

FIG. 8 is a conceptual view illustrating a text-type communication information input mode, and FIG. 9 is a conceptual view illustrating a voice-type communication information input mode.

Here, the information input mode may refer to a mode in which a user inputs communication information to be transmitted to an external device in performing communication with the external device. The controller 180 receives communication information from a user using at least one of the microphone 122 or the touch screen 151. The communication information received through the touch screen 151 may be text. In addition, the communication information received through the microphone 122 may be audio or voice.

Meanwhile, the controller may further determine whether a user is available to physically interact with the mobile terminal, whether the user is available to perform a speech input, whether the user is available to view the mobile terminal, or determine a noise level in the environment around the mobile terminal, and the like.

For example, it may be difficult to input text-type information in a situation where the user cannot physically interact with the mobile terminal or the user is unable to look at or view the mobile terminal. In this case, the mobile terminal may be changed to an input mode which allows the user to input communication information through the microphone 122.

On the other hand, when the user is unable to perform speech input to the mobile terminal or a surrounding noise level is higher than a predetermined level, it is difficult to receive voice-type information from the user. In this case, the mobile terminal may be changed to an input mode which permits input communication information through the touch screen 151.

In some embodiments, the controller may select an information input mode to receive the same type of communication information as information output by a preset information output mode.

Here, the type of communication information received from an external device may be different from that of communication information received from the user, and in this case, the controller 180 may convert the communication information received from the user into the same type as that of the communication information received from the external device, and transmit the converted information to the external device.

On the other hand, cases where the type of information corresponding to an information input mode is different from that of communication information received from an external device may be largely classified into two cases.

Firstly, a mobile terminal according to the present disclosure may receive voice information from an external device, and receive text information from a user. Secondly, a mobile terminal according to the present disclosure may receive text information from an external device, and receive voice information from a user. Hereinafter, each of the above two cases will be described in detail.

First, a case where voice information is received from an external device and text information is received from a user will be described with reference to FIG. 8.

As illustrated in FIG. 8, when a call signal is received from the external device in a TXT mode, the controller may display an execution screen of a messenger application, thereby allowing the user to perform communication with the external device through text messages.

When the user inputs a text message 820 using the touch screen 151, and then applies a transmission request, the controller may convert the text message input into voice information for transmission to the external terminal, since the original call signal was a request to connect using voice communication.

The controller may extract the user's speech pattern by the method described with reference to FIG. 6, and convert the text message inputted from the user into voice information using the extracted speech pattern.

Though not shown in the drawings, the controller may also compare at least one of a phone call record and a text message transmission/reception record between the user and a user of the external device with voice information received from the external device, and output a recommendation message list.

Specifically, controller may analyzes the meaning of the voice information received from the external device using information maintained at the learning data unit, and extract a conversation record including a sentence having a meaning similar to the analyzed meaning from at least one of the telephone call record and the text message transmission/reception record.

Then, the controller may form a recommendation message list based on the extracted conversation record.

The user may select any messages included in the recommendation message list to quickly transmit communication information to the external device. Through this, the present disclosure may provide a feeling that the user of the external device actually performs a phone call with the user of the mobile terminal despite the user not being available for voice communication.

On the other hand, even when a text message inputted from the user is converted into voice information 840 and transmitted to the external device, the text message 830 inputted from the user may also be displayed on the touch screen 151.

Through this, according to the present disclosure, when a user and an external device user perform communication, the user and the external device user may be using different communication modes.

Next, a case where text information is received from an external device, and voice information is received from a user will be described with reference to FIG. 9.

As illustrated in FIG. 9, the controller 180 may convert the text-type communication information received from an external device into voice information to output the voice information.

The controller may transmit the user's voice received through the microphone 122 as a reply message subsequent to outputting communication information received from the external device.

Here, the controller with the learning data unit 130 may recognize the user's voice received through the microphone 122 as a reply to the text message received from the external device only when a preset condition is satisfied.

Here, the preset condition may be receiving a voice input with a specific keyword or receiving a voice input within a preset period of time subsequent to outputting communication information received from the external device.

The controller may receive a voice input from the user through the microphone 122. At this time, there may occur a problem that sounds such as background noise, interference, outside conversation, or the like are received through the microphone 122 with the voice input. For example, noise output from a TV may be received from the microphone 122.

In order to clearly distinguish between background noise and a voice input from the user, the controller may convert a received voice input into a reply message only when a voice input with a specific keyword is recognized. For example, the controller may convert a received voice input into a reply message only when the voice input is recognized to include the words "reply to KIM".

Meanwhile, the controller may also convert a voice input received through the microphone 122 within a preset period of time subsequent to outputting communication information received from an external device into a reply message.

For example, referring to FIG. 9, the controller converts 960 a user's voice input 940 to text when the voice input is received through the microphone 122 within a preset period of time subsequent to outputting 930 communication information 920 received from an external device 910, and the controller 180 transmits the converted text to the external device.

In the above, embodiments in which a mobile terminal according to the present disclosure changes an information input mode based on a user's context information have been described.

In other embodiments, a face may be recognized from image information received through the camera 121, and an information output mode may be selected according to the recognition result.

Figure 10:
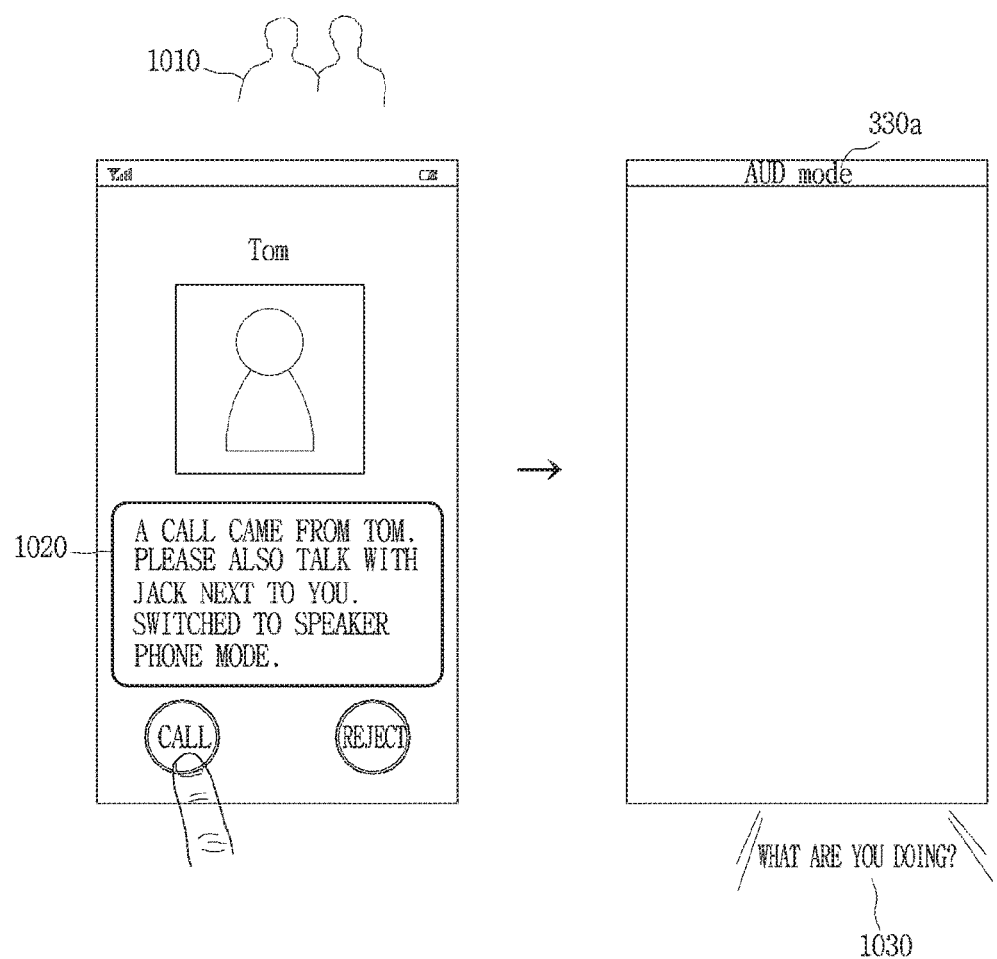
FIG. 10 is a conceptual view illustrating an embodiment of recognizing a face from image information received from the camera 121, and selecting an information output mode according to the recognition result.

FIG. 10 is a conceptual view illustrating an embodiment of recognizing a face from image information received through the camera 121, and selecting an information output mode according to the recognition result.

The camera may capture a surrounding environment 1010 of the user, and the controller, using the learning data unit, may recognize a face of a surrounding person from the captured image. Then, the controller may compare the recognized face with face information included in prestored contact information or stored at the learning data unit to determine the identity of a person corresponding to the face recognized from the captured image.

The controller, using the learning data unit, may then may calculate or determine a relationship level between the user and the recognized person based on past communication and conversation information with the recognized person stored in a messenger application, tagged and stored at the learning data unit, or the like.

Here, the controller may calculate the relationship level between the user and the surrounding person based on a conversation frequency, content of conversations, manner of conversation (e.g., casual speech vs. formal speech), and the like between the user and the recognized person.

The controller, using the learning data unit, may also calculate a relationship level between the user and a user of the external device from which communication is being received.

Then, controller may select whether or not to output communication information received from the external device while in the proximity of the recognized person based on the calculated relationship level between the user and the recognized person, as well as the calculated relationship level between the user and the user of the external device.

Specifically, when a relationship level between the user and the recognized person and a relationship level between the user and the user of the external device are above a preset value, the controller may be configured to provide the communication information received from the external device to the recognized person.

For example, referring to FIG. 10, the controller, using the learning data unit, may recognize a surrounding person (JACK) from an image received through the camera 121 when a call signal is received from an external device user (TOM). Here, when a relationship level between the external device user (TOM) and the user is above a preset value and relationship level between the user and the recognized person (JACK) is above a preset value, the controller may select an information output mode to output communication information using the speaker of the mobile terminal so that the recognized person may also hear the communication information, and also output a message 1020 indicating the selected information output mode.

Then, when the call connection request is accepted, the controller 180 outputs 1030 audio of the communication with the external device user (TOM) from the speaker so that the surrounding person (JACK) can hear it.

On the other hand, though not shown in the drawing, when at least one of a relationship level between the user and the recognized person or a relationship level between the user and the external device user is below a preset value, the controller may output communication information received from the external device in text only or output the communication information at a sound volume less a predetermined value using an audio output included in the audio output unit.

Next, an embodiment of changing an information output mode according to a user's position will be described.

Figure 11:
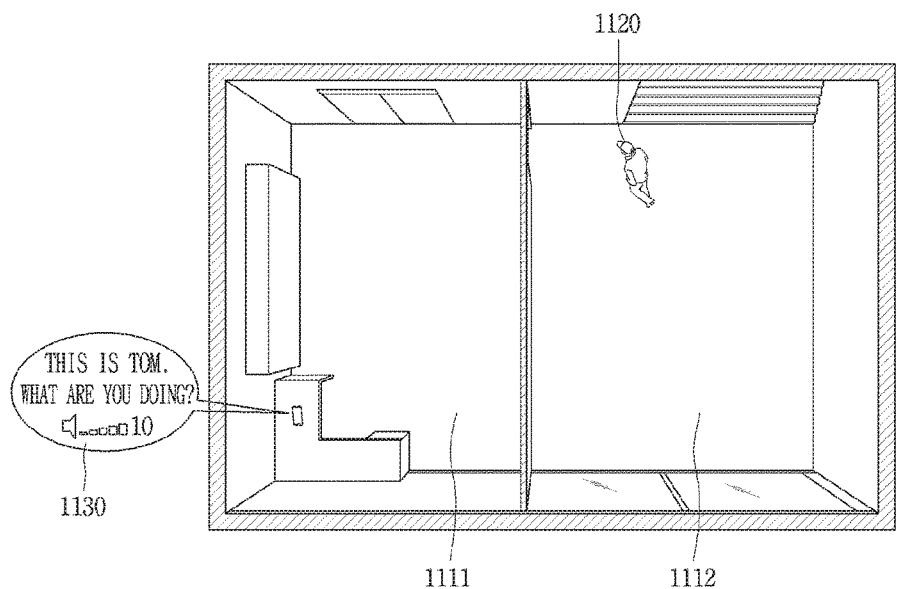
FIG. 11 is a conceptual view illustrating an embodiment of changing an information output mode according to a user's position.
Figure 11:
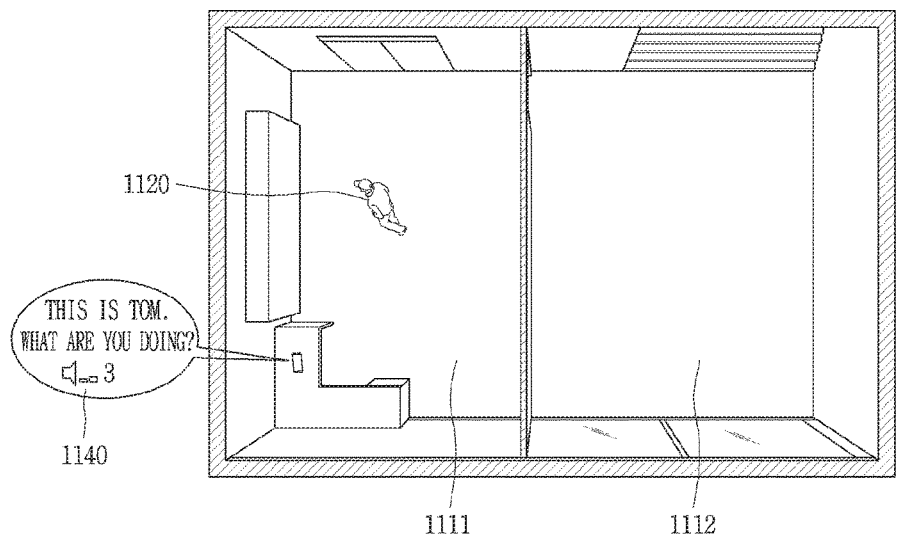

FIG. 11 is a conceptual view illustrating an embodiment of changing an information output mode according to a user's position;

The controller may obtain a distance between the mobile terminal and the user using information received through the microphone 122, the camera 121, or various sensors included in the mobile terminal. In addition, the controller may obtain the user's distance through wireless communication with an external device having at least one of the foregoing constituent elements.

Based on the distance information, the controller may determine an information output mode according to the distance between the mobile terminal and the user. Specifically, the controller may determine the user's responsiveness, and determine a volume of sound output from the speaker according to the responsiveness and the obtained distance between the mobile terminal and the user.

The controller stores a user's response speed or response or non-response according to a notification output or communication information output when a distance between the mobile terminal and the user is a specific value. For example, the learning data unit 130 may store a time it takes for the user to operate the mobile terminal subsequent to outputting a notification from the mobile terminal.

Based on the stored information, the controller may determine the user's cognitive ability. Accordingly, the controller may reduce a level of sound output from the speaker as the user's responsiveness increases.

On the other hand, the user's responsiveness may vary depending on the user's position relative to the mobile terminal. For example, differences in responsiveness may result when the user is located in a noisy kitchen compared to when the user is in a quiet bedroom.

The controller may obtain the user's responsiveness taking into account the user's position and distance from the terminal, and accordingly determine a level of the sound output from the speaker.

Specifically, the controller may obtain a user's position using one or more data points collected using the microphone 122, the camera 121, and/or various sensors included in the mobile terminal or an external device. Then, when the user is at a specific position with respect to the terminal, the controller may determine a responsiveness for the specific position according to the user's response speed or response or non-response according to a notification output or communication information output.

For example, referring FIG. 11, the controller may determine different levels of responsiveness when a user is in a same room 1111 and when the user is in an adjoining room 1112, and change a level of sound output from the speaker accordingly. Specifically, when a user 1120 is located in the adjoining room 1112, the controller may determine that the responsiveness is relatively low and increase a sound level of communication information 1130 output from the speaker. On the contrary, when the user 1120 is located in the same room 1111, the controller may determine that the responsiveness is relatively high and decrease a sound level of communication information 1140 output from the speaker.

As described above, a mobile terminal according to the present disclosure may selectively output only visual information or auditory information based on a user's availability, thereby allowing the user to easily receive communication information received from an external device.

In addition, a mobile terminal according to the present disclosure may receive information through a touch input or a voice input based on a user's availability, thereby allowing the user to easily input communication information to be transmitted to an external device.

According to the above effects, a mobile terminal according to the present disclosure may provide a communication device suitable for a user's context in performing communication with an external device. As a result, it may be possible to improve functionality of the mobile terminal, conserve processing power, conserve battery usage, and increase overall user convenience.

Meanwhile, a mobile terminal according to the present disclosure may collect a user's context information using an input unit of an external device, and select an information output mode at an output unit of the external device according to the context information.

Specifically, the external device may be a vehicle. A mobile terminal according to the present disclosure may perform communication with the vehicle in a wired or wireless manner, and control the vehicle through communication with the vehicle. Such a communication method may be short-range communication, V2X communication, optical communication, or the like applied to the vehicle, and moreover, a communication method capable of communicating with the vehicle may be also used. When the mobile terminal is used for vehicle control, it may also be referred to as a driving assistance device, a vehicle control device, a vehicle driving device, or the like.

When the mobile terminal is used for vehicle control, the mobile terminal may be used to assist communication of the passengers in the vehicle.

Hereinafter, problems that may occur when passengers perform communication within a vehicle will be described.

The passengers in the vehicle typically speak to each other during transport. For this disclosure, a talker is defined as a person who performs a speech act. Here, a speech means a sequence of words or other audible communication spoken by a person. In particular, during a discourse, a speech means a word sequence having a certain independence which are separated by a silence. A speech may be associated with speaking a sentence of some meaning, and may include one or more sentences.

On the other hand, there may be a listener during a speech act of a talker. Here, a listener of a speech act means a person who listens to a speech act of the talker. A talker may speak to a plurality of listeners, and any use of a singular listener will be understood to include examples with plural listeners.

The talker may select a listener by looking at the listener or calling the listener's name to get their attention. In other words, a person may not necessarily become a listener because he or she is located in proximity to the talker. A listener may grasp the fact that he or she is specified as a listener through a voice, a gesture, a gaze, or the like of the talker and listen to a voice of the talker.

As described above, it may be possible to recognize the designation of a listener corresponding to the talker, and the fact that a listener himself or herself is specified as the listener is carried out by a behavior prior to or during a speech of the talker.

According to an embodiment of the present disclosure, in order to define a relationship with a listener formed by a behavior prior to or during a speech of the talker, the listener is expressed as a "listener to be an object of a speech act," a "listener corresponding to the talker," a "listener of the talker," or the like.

Through a speech act carried out subsequent to specifying a listener, the talker transmits a communication intended for the listener. At this time, the intention of communication is transmitted through a voice of the talker.

As described above, a talker's communication intention transmission is carried out by allowing the talker to specify a listener, and allowing the talker to transmit a voice to the listener. On the other hand, in certain situations, it may be difficult for the talker to specify a listener, and it may be difficult for a listener to recognize that he or she is specified as the listener. For example, this may include a case where the talker is unable to look at the listener, a case where the listener is unable to look at the talker, a case where the listener is unable to listen to the talker's voice, and the like.

Furthermore, the talker's voice may not be delivered to the listener in some cases. For example, the specific situation may include where a physical distance between the talker and the listener is large, where a background noise surrounding the talker and the listener is noisy, and the like.

Here, a situation in which the talker is unable to specify the listener, a situation in which it is difficult for a listener to recognize that he or she is specified as the listener, or a situation in which the talker's voice is not transmitted to the listener may be commonly generated within the vehicle.

For example, describing a case where a driver of a vehicle is a talker and one or both of two passengers in the rear seat is a listener, the driver may be unable to safely look at the rear seat passengers and it may be difficult for the rear seat passengers to recognize the driver's intended gaze. Furthermore, when it is noisy within the vehicle, it is difficult for the driver's voice to be transmitted to the rear seat passenger.

As described above, it may be difficult for the talker's communication to be transmitted to the listener within the vehicle. The present disclosure facilitates the transmission of communication information of a talker within a vehicle.

To this end, a mobile terminal according to an embodiment of the present disclosure controls at least one of a camera or a microphone included in the mobile terminal, and a camera, a microphone, and/or a plurality of speakers disposed in the vehicle. Hereinafter, a vehicle control method of a mobile terminal will be described.

Figure 12:
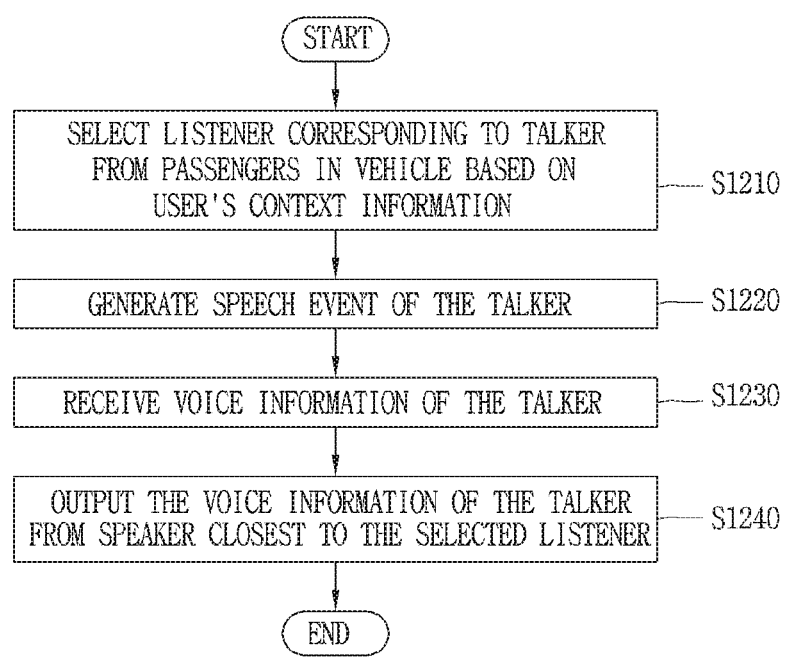
FIG. 12 is a flow chart illustrating a method of allowing a mobile terminal according to the present disclosure to control a vehicle.

FIG. 12 is a flow chart illustrating a method of controlling a vehicle according to an embodiment of the present disclosure.

First, a listener may be selected from passengers based on the talker's context information (S1210).

Here, the talker may be any one of the passengers in the vehicle. In other words, the talker is not fixed to any position or any one of the passengers, but any of the persons within the vehicle becomes the talker when they begin speaking.

Accordingly, the context information may not be collected only for one of the passengers to select a listener, but the context information of each of the passengers may be collected to select a listener corresponding to any one of the other passengers based on the collected context information.

In order to collect the context information of a talker and select a listener corresponding to the talker, the controller may recognize passengers in a vehicle. Specifically, the controller, using the learning data unit, may recognize the position of each of the passengers within the vehicle or match each of the passengers with prestored contact information stored at the mobile terminal, for example at the learning data unit. Then, the controller may recognize that "a passenger (talker) at a first position has selected a passenger at a second position as a listener" or recognize that "a passenger (talker) corresponding to first person information has selected a passenger corresponding to second person information as a listener" using the position information and person information of each of the passengers.

Specifically, taking an example in which the controller, using data stored at the learning data unit, recognizes a passenger using position information within a vehicle, the controller may obtain the position of each of the passengers using at least image information received through the camera, voice information received through the microphone, or sensing values received through various sensors disposed in the vehicle. When specifying a talker or selecting a listener corresponding to the talker, the controller may use the position of each of the passengers.

On the other hand, taking an example in which the controller selects a listener using the person information of the passengers, the controller may match any one of a plurality of prestored profile information with any one of the passengers using information stored at the terminal, for example at the learning data unit. At this time, controller compares at least one of image information received through the camera and voice information received through the microphone with prestored profile information at the learning data unit to match the person information with each of the passengers.

Here, profile information may be information related to a specific person stored in at least one of a mobile terminal such as the learning data unit, a vehicle, or a preset server, and may include at least name information, contact information, face information, or voice information for a specific person.

The controller, using the learning data unit, may recognize the faces of passengers from image information received through the camera and compare the recognized faces with face information included in prestored profile information to match a specific passenger with specific person information.

On the other hand, the controller may receive the voice information of each passenger through the microphone, and compare the received voice information with voice information included in prestored profile information to recognize that a person corresponding to specific profile information is in the vehicle.

Meanwhile, the controller may perform the processes of recognizing the positions of passengers within a vehicle and matching each of the passengers with prestored profile information at the same time.

The foregoing recognition of passengers by the controller and/or learning data unit 130 may be carried out when the passengers are changed or when the passengers move their positions within the vehicle. Then, controller may select a listener corresponding to any one of the recognized passengers.

At least one of the passengers within a vehicle excluding a talker may be selected as a listener. Because a listener corresponding to a talker may be selected differently depending on who the talker is, each of the passengers within the vehicle may be a speaker and a listener.

Meanwhile, the terminal may collect the context information of a talker using at least one of a camera or a microphone included in the mobile terminal, and a camera and a microphone disposed in the vehicle.

In the present specification, the collected context information of a talker for vehicle control is referred to as behavior information of the talker. The behavior information may include at least the gaze information, gesture information, or voice information of a talker, but the present disclosure may not be necessarily limited to this.

The controller extracts at least the gaze information or gesture information of the talker from image information received through a camera included in at least the vehicle or the mobile terminal, and collects the voice information of the talker through a microphone included in at least the vehicle or the mobile terminal.

The controller may specify at least a talker or a listener using at least image information received through a camera or voice information received from a microphone. At this time, the controller may select a listener using the positional information and/or profile information of each passenger, which is used when recognizing the passengers. In other words, the controller may select a specific position within the vehicle based on the behavior information of the talker or select profile information matched with each of the passengers.

Meanwhile, the controller may select a listener using the behavior information of the talker in various ways. Specific embodiments in which the controller selects a listener will be described below with reference to the accompanying drawings.

A method including selecting a listener, and generating a speech event of a talker (S1220) so as to receive the voice information of the talker (S1230) is discussed with respect to FIG. 12.

Since each of the passengers within the vehicle may be a talker, when receiving voice information, the controller may determine which passenger is speaking. To this end, the controller may classify passengers who perform a speech act based on at least voice information received through a microphone or image information received through a camera.

For example, the controller may compare voice information received through the microphone with profile information matched to each of the passengers to determine who a current talker is.

For another example, the controller may extract gesture information related to a lip movement from image information received through the camera, and determine a current talker based on the extracted gesture information.

Finally, the controller may receive the voice information of the talker through the microphone included in at least the vehicle or the mobile terminal, and then output the voice information from a speaker closest to the listener among a plurality of speakers disposed in the vehicle (S1240).

A plurality of speakers may be disposed in the vehicle. Specifically, as many speakers as a number of passengers who can ride in the vehicle may be disposed in the vehicle. On the other hand, each of the plurality of speakers may be disposed adjacent to each of the passengers when all persons capable of boarding the vehicle are boarded. As a result, a sound output from each speaker is heard most loudly by any one of the passengers nearest to the outputting speaker.

The controller may output voice information received from a talker using a speaker closest to the selected listener to transmit a voice of the talker to the selected listener, and may output the voice information at a particular level or the highest level available, depending on environmental factors, such as cabin noise.

When the controller selects a listener using the position information of the passengers, the controller may output a voice received from a talker from a speaker disposed closest to the position of the selected listener.

On the other hand, when the listener is selected using the profile information of passengers, the controller, using the learning data unit, may recognize the position of the listener within the vehicle using image information received from the camera and/or profile information corresponding to the listener. Specifically, the controller may recognize a face corresponding to face information included in the profile information corresponding to the listener, and recognize a position within the vehicle where the recognized face is located as the position of the listener. Then, the controller may output a voice received from a talker from a speaker disposed closest to the recognized position of the listener.

As described above, a listener selection method and a method of outputting a voice received from a talker may be changed according to selection of a listener.

On the other hand, the voice information of the talker is preferably output from the speaker as soon as it is received through the microphone from the talker. In case where the voice information of the talker is output from the speaker, the listener may faintly hear a voice of the talker directly, and also hear voice information output from the speaker at the same time, or at a delay, thereby causing a confusion and disorientation to the listener.

As described above, the controller according to an embodiment of the present disclosure may control a terminal and vehicle to efficiently perform communication between passengers within the vehicle.

Hereinafter, specific embodiments for selecting a listener based on the behavior information of a talker will be described with reference to the accompanying drawings.

In the following embodiments, a case where one of passengers is assumed to be a talker to select a listener will be described, but the present disclosure may not be necessarily limited to this, and each of the passengers in the vehicle may be a talker.

Meanwhile, a plurality of speakers may be disposed at various positions within the vehicle, but in the following embodiments, for the sake of convenience of explanation, a case where speakers are disposed at each of four vehicle doors in a vehicle including the four vehicle doors shown in FIG. 13 (1310*a* through 1310*d*) will be described as an example. Furthermore, in the following embodiments, a case where three persons (driver's seat, left and right rear seats) are occupied on a four-seater vehicle will be taken as an example.

A camera 1320 disposed on a rearview mirror 1350 disposed in the vehicle is illustrated in the following drawings, but at least one camera other than the camera 1320 may be further disposed within the vehicle. For example, cameras may be disposed at positions capable of capturing at least a rearview mirror or a side mirror view within the vehicle.

First, an embodiment of selecting a listener based on the gaze information of a talker will be described.

Figure 13A:
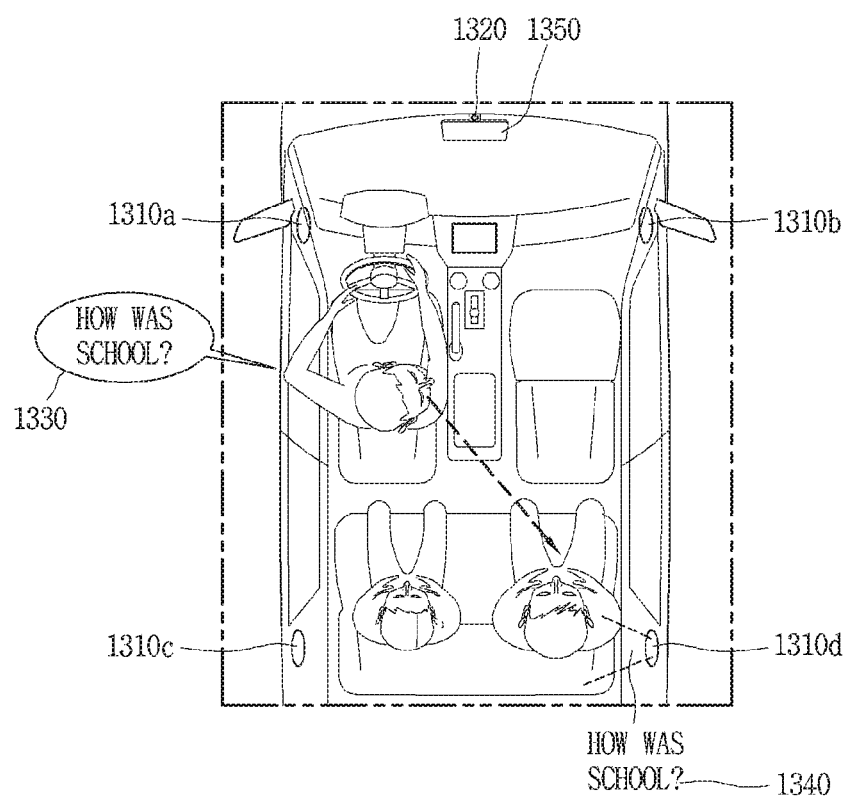
FIGS. 13A and 13B are conceptual views illustrating an embodiment of selecting a listener based on the gaze information of a talker.
Figure 13B:
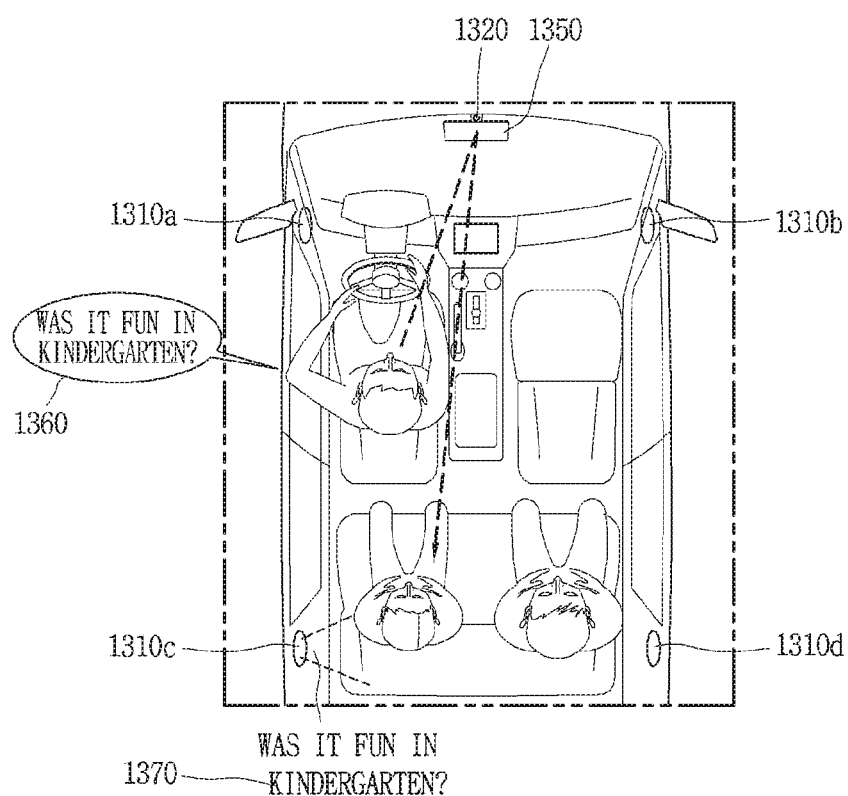

FIGS. 13A and 13B are conceptual diagrams illustrating an embodiment of selecting a listener based on the gaze information of a talker.

The controller may determine the gaze information of a talker from image information received through a camera provided at the mobile terminal or the vehicle.

The gaze information may include information that defines a direction of the talker's gaze. The controller may recognize a direction of the talker's gaze from an image of a face of the talker.

The gaze information may be used when the controller recognizes passengers corresponding to positions within a vehicle. Specifically, the controller may recognize a gaze direction, and specify a position within the vehicle where the talker is gazing based on the recognized direction. Then, the controller may select a passenger recognized at the specified position as a listener.

Meanwhile, when a listener is selected using gaze information, the controller may maintain the selected state of the listener for a preset period of time or while a predetermined condition is satisfied even if the direction of the talker's gaze is changed subsequent to selecting the listener.

Here, the preset condition may be at least one of not selecting another listener according to the behavior information of the talker, or not ending a speech act of the talker, but the present disclosure may not be necessarily limited to this. In other words, the controller may not change a previously selected listener until the talker selects a new listener or a speech act of the talker is ended.

Referring to FIG. 13A, considering an embodiment of selecting a listener when the talker is a driver based on the gaze information, the controller determines the gaze information of the talker from image information received through the camera, and recognize a direction in which the talker faces based on the extracted gaze information. The controller recognizes that the talker gazes toward a right rear seat based on the gaze information of the talker. Accordingly, the controller selects a passenger in the right rear seat as a listener.

For example, when voice information 1330 ("How was school?") is received from the talker, the controller outputs 1340 the voice information received from the talker from the speaker 1310*d* disposed nearest to the right rear seat. The passenger in the right rear seat may recognize that the talker is directing the question to him/her as a listener and more clearly hear the question through the speaker.

On the other hand, the gaze information of the talker may be extracted not only from an image directly captured of the talker but also from an image captured by a mirror disposed in the vehicle. Image information received through the camera may include an image that has captured a mirror image disposed in the vehicle. At this time, at least one passenger may be seen in the mirror, and accordingly, the image that has captured the mirror image may include an image of at least one passenger.

Here, the mirror disposed in the vehicle may be a rearview mirror or a side mirror.

The controller may recognize a mirror disposed in the vehicle from image information received through the camera, and recognize a talker reflected in the mirror. The controller may determine the gaze information of the talker from an image of the talker reflected in the mirror. The controller may recognize the position of a mirror viewed by the talker based on the gaze information, and recognize a position within the vehicle viewed by the talker through the mirror based on the recognized position of the mirror and the position of the talker within the vehicle.

Based on the recognition result, the controller may select a passenger at a position within the vehicle viewed by the talker through the mirror.

Referring to FIG. 13B, an embodiment is discussed of selecting a listener based on the gaze information of a talker extracted from an image that has captured a mirror image when the talker is a driver, where the talker is gazing at a passenger in a left rear seat through the rearview mirror 1350.

When voice information 1360 ("Was it fun in kindergarten?") is received from the talker, the controller outputs 1370 the voice information received from the talker from the speaker 1310*c* disposed nearest to the left rear seat.

In the above, an embodiment of selecting a listener based on the gaze information of a talker has been described.

Hereinafter, an embodiment of selecting a listener based on name information extracted from the voice information of the talker will be described.

Figure 14A:
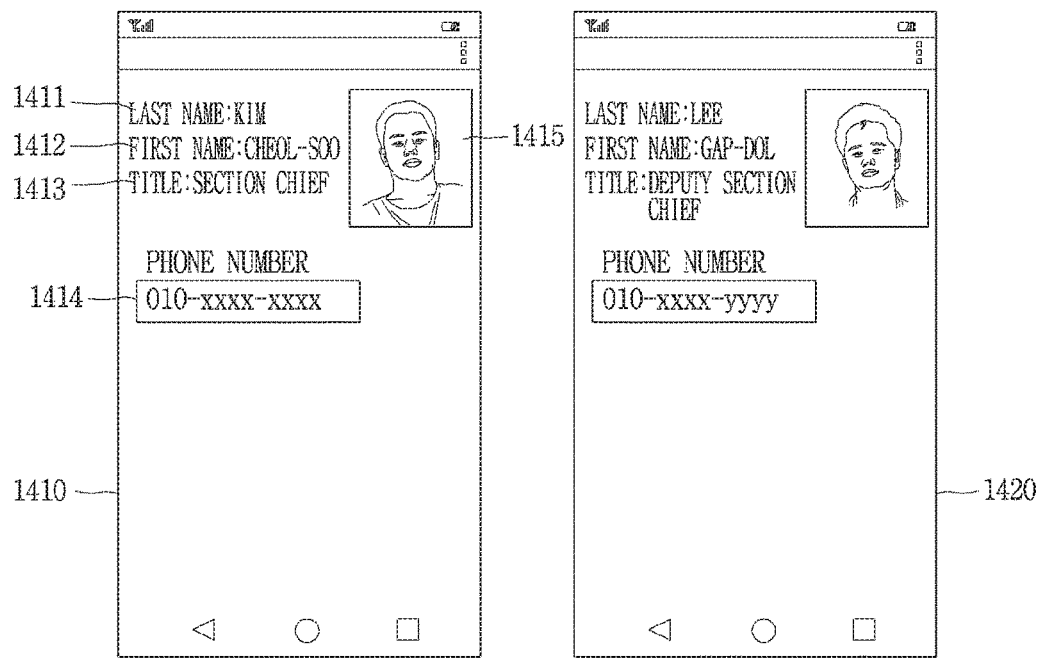
FIGS. 14A through 14C are conceptual views illustrating an embodiment of selecting a listener based on name information.
Figure 14B:
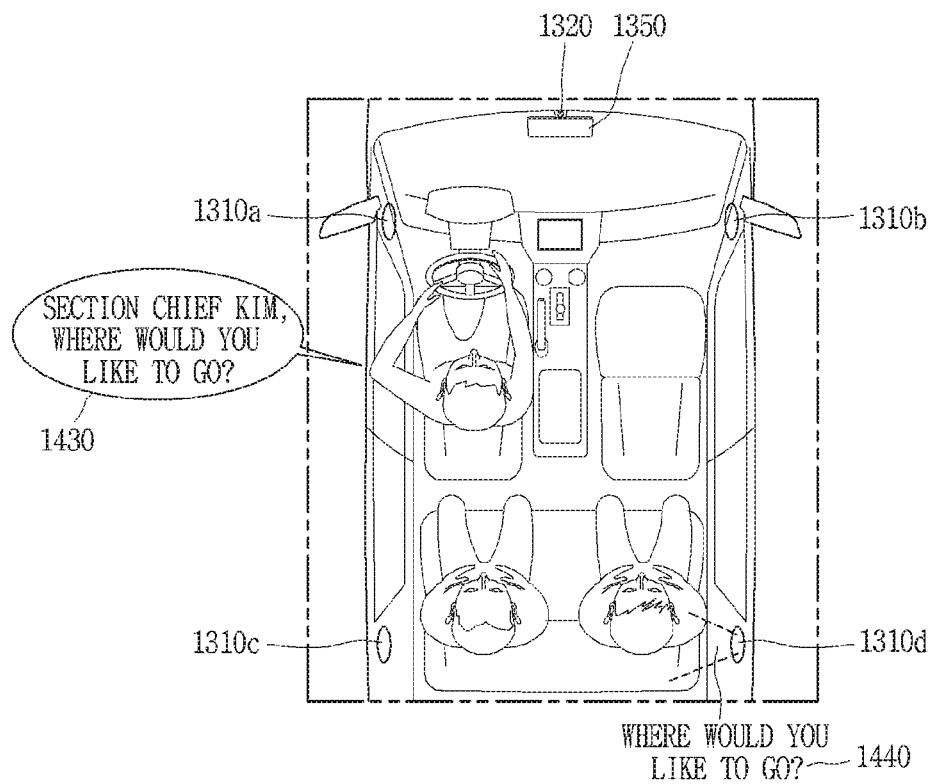
Figure 14C:
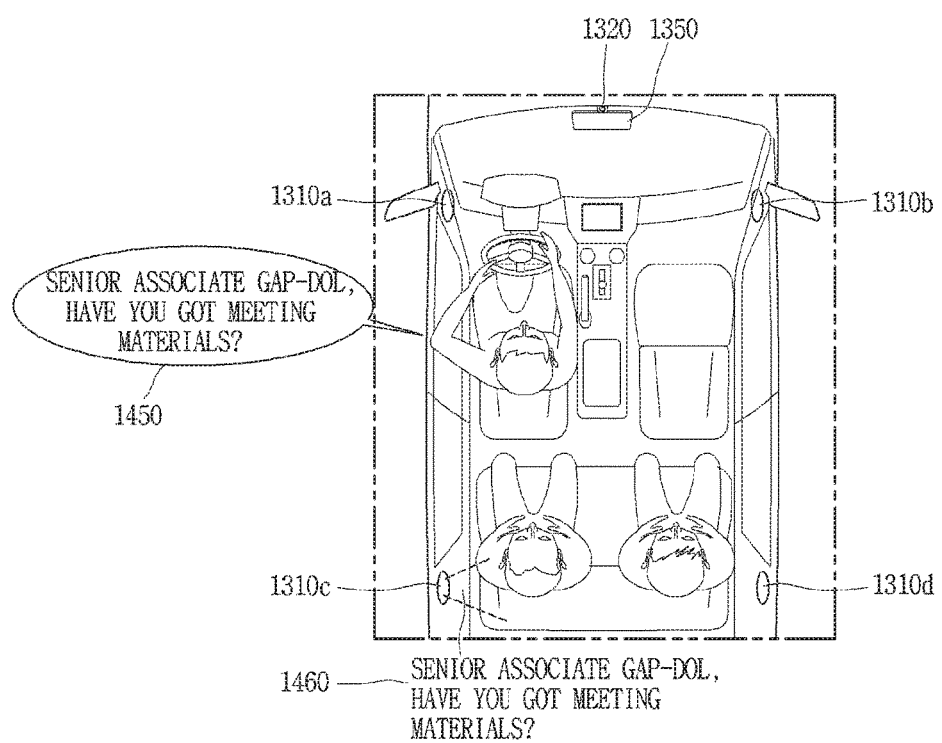

FIGS. 14A through 14C are conceptual diagrams illustrating an embodiment of selecting a listener based on name information.

The controller may select a listener using voice information received when a talker starts a speech act. Such a selection may be used when the controller recognizes passengers using profile information.

The controller may extract name information from the voice information received at the start of a speech act of the talker, and select a listener based on the name information.

The controller may match each of the passengers with prestored profile information as discussed above. Here, the profile information may include name information, and the controller may compare the name information included in the profile information with the voice information of the talker, and select a passenger corresponding to a profile information including a matching name.

Describing prestored profile information with reference to FIG. 14A, at least a last name 1411, a first name 1412, a title 1413, contact information 1414 or face information 1415 of a specific person may be stored in the mobile terminal, for example at the learning data unit. Here, name information included in profile information 1410 may be plural. For example, for the profile information, a last name 1411, a first name 1412, and a title 1413, respectively, of a specific person are name information related to a specific person.

The controller and/or learning data unit 130 may combine a plurality of pieces of name information included in the profile information to predict a title for a specific person to be called. For example, referring to profile information 1410 in FIG. 14A, the controller and/or learning data unit 130 may predict that a person corresponding to the person information is to be called "Kim Cheol-Soo,", "Cheol-Soo," "Section Chief Kim," or "Section Chief Kim Cheol-Soo," using predicted name variations or combinations with the person's title.

When a predicted name from the profile information is detected in the voice information of the talker, the controller select a listener based on the detected name.

Hereinafter, an embodiment of selecting a listener using profile information illustrated in FIG. 14A will be further described with reference to FIGS. 14B and 14C.

First, referring to FIG. 14B, the controller may extract name information ("Section Chief Kim") from voice information 1430 ("Section Chief Kim, where would you like to go?") received through a microphone, either of the vehicle or the terminal. Then, the controller compares the extracted name information with the profile information illustrated in FIG. 14A, and selects a passenger corresponding to the profile information in which the name information of "Kim" and "Section Chief" are stored as a listener.

Subsequent to selecting the listener, the controller outputs the voice information of the talker from a speaker closest to a position (right rear seat) at which the listener is sitting. Here, since the controller selects a listener based on name information extracted from voice information, and then outputs the voice information from the speaker, the voice information output from the speaker may be voice information 1440 ("Where would you like to go?"), with the name of the listener removed, since the listener has been selected based on the name information.

Next, referring to FIG. 14C, the controller extracts name information ("Gap-Dol") from voice information 1450 ("Senior Associate Gap-Dol, have you got meeting materials?") received from the microphone. Then, the controller may compare the extracted name information with the profile information as illustrated in FIG. 14A, and select a passenger corresponding to the person information including name information "Gap-Dol" as a listener.

Subsequent to selecting the listener, the controller outputs 1460 the voice information of the talker from the speaker 1310*c* closest to the position (left rear seat) at which the listener is sitting.

In the above, an embodiment selecting a listener based on name information has been described.

Hereinafter, an embodiment of determining a mode of outputting voice information received from a talker based on the gesture information of the talker will be discussed.

Figure 15:
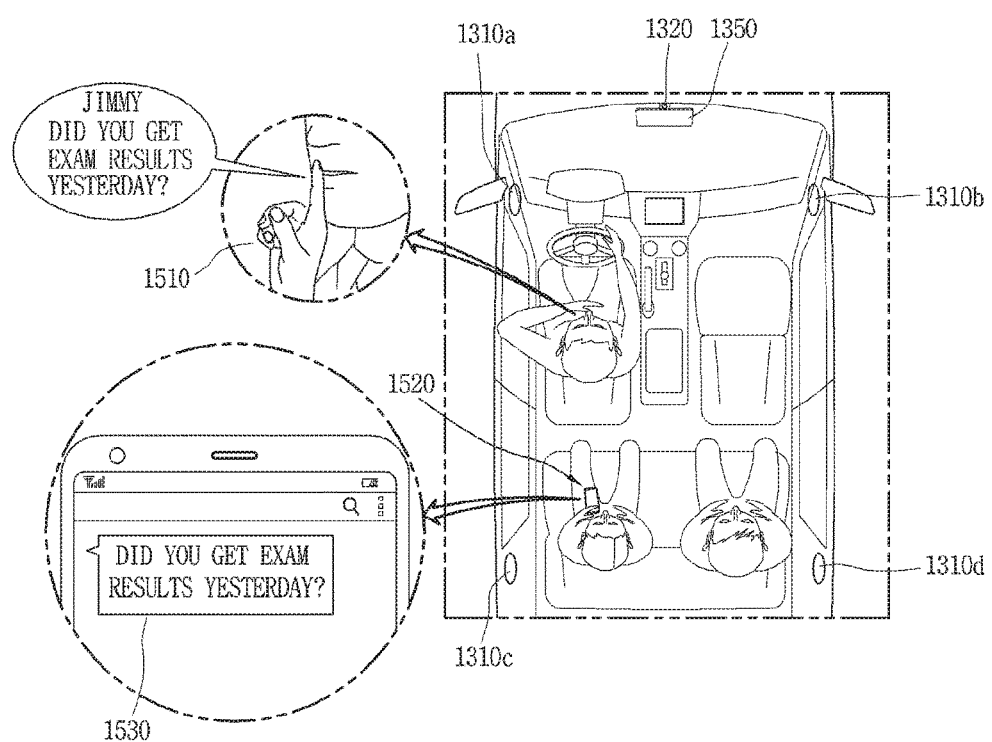
FIG. 15 is a conceptual view illustrating an embodiment of allowing an learning data unit to determine a mode of outputting voice information received from a talker based on the gesture information of the talker.

FIG. 15 is a conceptual view illustrating an embodiment of determining a mode of outputting voice information received from a talker based on the gesture information of the talker.

The controller may determine gesture information of the talker from image information received through the camera, either at the vehicle or the terminal. At this time, when the determined gesture information satisfies a preset condition, the controller may output voice information received from a talker to an output device other than a speaker disposed in the vehicle.

Here, the preset condition may include a case where a hand of the talker covers at least part of a mouth of the talker, a case where lips of the talker moves while a voice of the talker is not received, or a case where only one of the eyes of the talker is blinking, but the present disclosure may not be necessarily limited to this.

When gesture information determined from image information received from the camera satisfies a preset condition, the controller outputs voice information received from the talker through a mobile terminal or an external device that is communicable with the vehicle in a wireless manner.

For example, the controller may select a listener corresponding to the talker based on behavior information other than the determined gesture information, and transmits voice information received from the talker to an external device corresponding to the selected listener.

Here, the controller transmits the voice information received from the talker to the external device corresponding to the listener using contact information included in stored profile information corresponding to the selected listener.

The controller may convert the voice information received from the talker and transmit the converted voice information to an external device corresponding to the listener. For example, the controller may convert the voice information received from the talker to text to display the voice information on the external device corresponding to the listener as text.

For example, describing an embodiment in which the voice information of a talker is displayed as text on an external device, the controller determines the gesture information of a talker from image information received through a camera. When the controller senses a gesture 1510 in which a hand of the talker covers at least part of a mouth of the talker, the controller may output the voice information of the talker to an external device 1520 corresponding to the listener without a speaker disposed in the vehicle.

Specifically, in one example, the controller determines an output method of voice information received from the talker based on gesture information, and then selects a listener corresponding to the talker based on name information extracted from voice information received from the microphone as illustrated in FIGS. 14A through 14C.

Then, the controller converts voice information received from the talker into text, and transmits the converted text to an external device corresponding to the listener based on contact information included in profile information. Accordingly, a text message 1530 of the transcribed voice information is displayed on the external device 1520 corresponding to the listener.

As described above, the controller may transfer the communication information of the talker only to a specific passenger based on a gesture of the talker.

In the above, an embodiment of determining a mode of outputting voice information received from a talker based on the gesture information of the talker has been described.

Hereinafter, an embodiment of outputting voice information received from a talker based on the operation state of an external device will be discussed.

Figure 16:
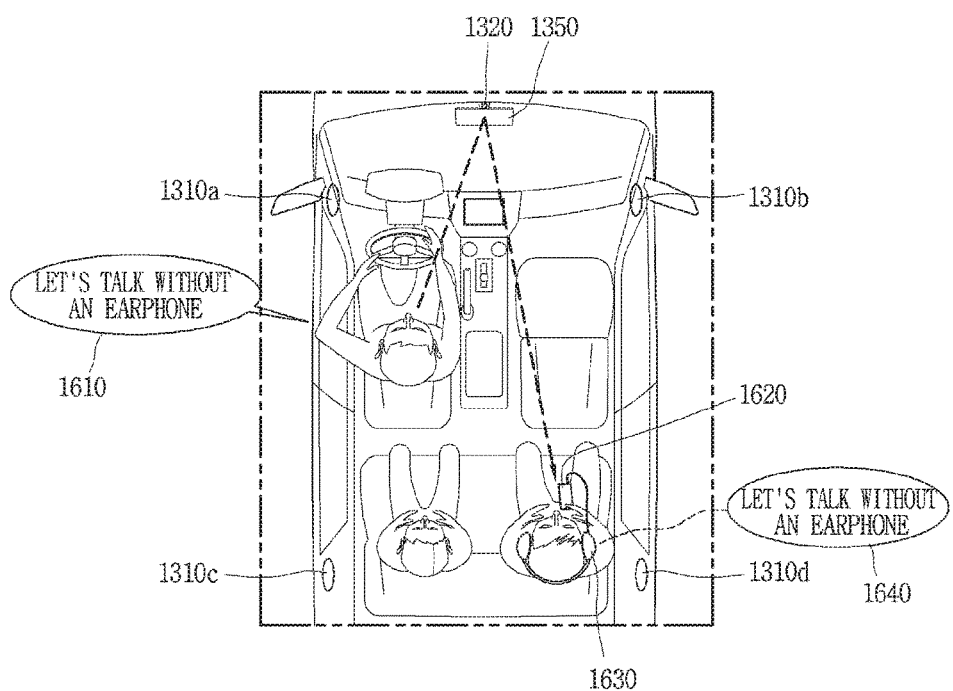
FIG. 16 is a conceptual view illustrating an embodiment of allowing the learning data unit 130 to output voice information received from a talker based on the operation state of an external device.

FIG. 16 is a conceptual view illustrating an embodiment of outputting voice information received from a talker based on the operation state of an external device.

The controller may select a listener based on the behavior information of the talker and perform wireless communication with an external device corresponding to the listener based on contact information included in profile information corresponding to the listener.

The controller collects the operation state of an external device corresponding to the listener through wireless communication, and determines an output mode of voice information received from the talker according to the operation state of the external device.

Here, the operation states of the external devices may include whether a display of the external device is turned on or off, whether the external device is coupled with earphones, or whether a specific application is being executed at the external device, but the present disclosure may not be necessarily limited to this.

The controller may output voice information received from the talker by the external device instead of using speakers disposed in the vehicle when the operation state of the external device satisfies a preset condition.

For example, referring to FIG. 16, the controller selects a listener corresponding to a talker in a manner described with reference to FIG. 13B, and when an external device 1620 corresponding to the listener is coupled to earphones 1630, the controller transmits voice information 1610 of the talker ("Let's talk without an earphone") to the external device corresponding to the listener such that the voice information is output from the earphone of the external device. Accordingly, the voice information received from the talker is output 1640 from the earphone 1630 of the external device.

For another example, when a messenger application is being executed on the external device corresponding to the listener, the controller may convert voice information of the talker into text, and then transmit the converted text to the external device to output the voice information on an execution screen of the messenger application at the external device.

In the above, an embodiment of outputting voice information received from a talker based on the operation state of an external device has been described.

Hereinafter, an embodiment of determining an output mode of voice information received from the talker according to a level of background noise will be discussed.

Figure 17:
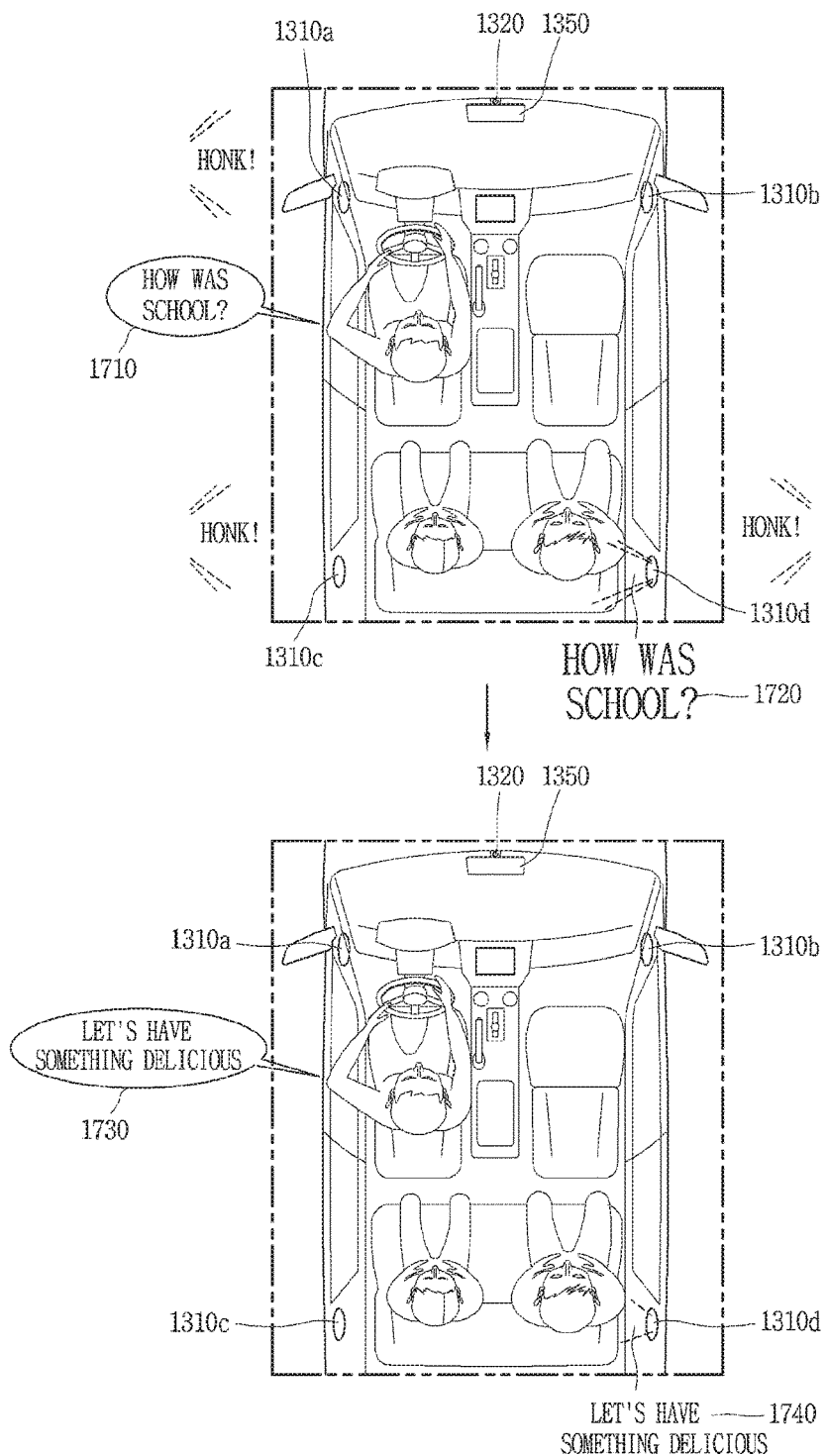
FIG. 17 is a conceptual view illustrating an embodiment of allowing the learning data unit to determine an output mode of voice received from a talker according to a level of background noise.

FIG. 17 is a conceptual view illustrating an embodiment of determining an output mode of voice received from a talker according to a level of background noise.

The controller may measure a level of background noise using a microphone included in the mobile terminal or a microphone included in the vehicle. Then, the controller may increase a level of voice information output from a speaker in proportion to the level of background noise.

Considering a case where the talker is a driver, and a listener corresponding to the talker is selected as a passenger on a right rear seat with reference to the example of FIG. 17, the controller may output 1720 voice information 1710 ("How was school?") received from the talker as a first output value from a speaker when a level of background noise is above a preset value.

On the contrary, when a level of background noise is below a preset value, the controller may output 1740 voice information 1730 ("Let's have delicious food") received from the talker as a second output value different from the first output value. At this time, the first output value may be larger than the second output value.

As described above, a voice of the talker may be output from a speaker closest to the listener, thereby facilitating communication between the talker and the listener.

The foregoing embodiments may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
an audio output unit;
a display;
a camera configured to capture image information; and
a controller configured to:
  obtain context information of a user of the mobile terminal, wherein the context information is obtained from the image information captured via the camera;
  set an output mode of the mobile terminal based on the obtained context information;
  convert communication information of a first type received from an external device to a second type associated with the set output mode when the first type and the second type are different; and
  control at least the audio output unit or the display to output the communication information,
  wherein the audio output unit or the display is used to output the communication information based on the set output mode,
  wherein obtaining the context information comprises:
  recognizing at least one face from the image information captured via the camera;
  determining an identity of a surrounding person associated with the recognized at least one face;
  determining a first relationship level between the user and a user of the external device; and
  determining a second relationship level between the user and the surrounding person, and
  wherein the output mode is set to a first output mode if both the first relationship level and the second relationship level are above a preset value, and set to a second output mode if at least one of the first relationship level or the second relationship level is below the preset value.

2. The mobile terminal of claim 1, wherein the set output mode corresponds to outputting the communication information using only one of the audio output unit or the display.

3. The mobile terminal of claim 1, wherein the set output mode corresponds to outputting the communication information as only one of text-type or voice-type information.

4. The mobile terminal of claim 3, wherein the controller is further configured to convert the communication information received from the external device from voice-type to text-type when the set output mode is for outputting only text-type information.

5. The mobile terminal of claim 3, wherein the controller is further configured to convert the communication information received from the external device from text-type to voice-type when the set output mode is for outputting only voice-type information.

6. The mobile terminal of claim 3, wherein the communication information received from the external device is an image and the controller is further configured to:
  recognize at least one feature of the image based data stored at the mobile terminal;
  generate voice-type information corresponding to the recognized at least one feature when the set output mode is for outputting only voice-type information; and
  control the audio output unit to output the generated voice-type information.

7. The mobile terminal of claim 1, wherein the obtained context information comprises at least location information, schedule information, body information of the user, driving state information, information of people within a proximity to the mobile terminal, a distance between the user and the mobile terminal, or a usage history of the mobile terminal.

8. The mobile terminal of claim 1, wherein the first output mode corresponds to outputting the communication information using only the audio output, and wherein the second output mode corresponds to outputting the communication information using only the display.

9. The mobile terminal of claim 1, further comprising a microphone, wherein the display is a touch screen and the controller is further configured to:
  set an input mode of the mobile terminal based on the obtained context information; and
  control at least the microphone or the touch screen to permit receiving of input information to be transmitted to the external device based on the set input mode.

10. The mobile terminal of claim 9, wherein the controller is further configured to convert the input information received via the microphone or touch screen from a first type to a second type matching a type of the communication information received from the external device.

11. The mobile terminal of claim 9, wherein the controller is further configured to:
  determine whether the user is available to input information as a voice-type or a text-type based on the obtained context information; and
  set the input mode based on the determination result.

12. The mobile terminal of claim 11, wherein the set input mode corresponds to inputting information via only one of the touch screen or the microphone.

13. The mobile terminal of claim 1, further comprising a learning data unit configured to store data to implement machine learning of context information, wherein the controller is further configured to reference data stored at the learning data unit to process information received via a microphone, a sensor, or a camera of the mobile terminal to obtain the context information.

14. The mobile terminal of claim 13, wherein the referenced data comprises a plurality of images, a plurality of audio files, or historical usage data of the mobile terminal.

* * * * *